US012706807B2

(12) United States Patent
Cao et al.

(10) Patent No.: US 12,706,807 B2

(45) Date of Patent: Aug. 11, 2026

(54) POLICY CONFLICT MANAGEMENT METHOD, APPARATUS, AND SYSTEM

(71) Applicant: HUAWEI TECHNOLOGIES CO., LTD., Shenzhen (CN)

(72) Inventors: Longyu Cao, Shanghai (CN); Yaoguang Wang, Shanghai (CN); Yijun Yu, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 403 days.

(21) Appl. No.: 18/341,779

(22) Filed: Jun. 27, 2023

(65) Prior Publication Data

US 2023/0344717 A1 Oct. 26, 2023

Related U.S. Application Data

(63) Continuation of application No. PCT/CN2021/078487, filed on Mar. 1, 2021.

(30) Foreign Application Priority Data

Dec. 28, 2020 (WO) ................ PCT/CN2020/139884

(51) Int. Cl.
*H04L 41/0894* (2022.01)
*H04W 8/18* (2009.01)

(52) U.S. Cl.
CPC ........... *H04L 41/0894* (2022.05); *H04W 8/18* (2013.01)

(58) Field of Classification Search
CPC ............................. H04L 41/0894; H04W 8/28
See application file for complete search history.

(56) References Cited

U.S. PATENT DOCUMENTS 10,327,177 B1 * 6/2019 Mathison .......... H04W 28/0268
12,082,273 B2 * 9/2024 Xu ........................ H04W 76/12

(Continued)

FOREIGN PATENT DOCUMENTS

CN 103974387 A 8/2014
CN 106375975 A 2/2017

(Continued)

OTHER PUBLICATIONS

Thoralf Czichy:"5G RAN optimization using the O-RAN software community''s RIC (RAN Intelligent Controller)." ONS Europe, Sep. 23, 2019. total 23 pages.

(Continued)

*Primary Examiner* — Dhairya A Patel

(57) ABSTRACT

In a policy conflict management method, a first controller receives first policy information that comprises a first policy configured by a core network for UE. The first controller detects that a policy conflict occurs between the first policy information and second policy information, where the second policy information includes a second policy configured by a second controller for the UE, or a first decision result obtained after the first controller makes a policy decision according to the second policy. The first controller makes a policy decision according to the first policy and the second policy to obtain a second decision result. The first controller then sends the second decision result to a radio access network RAN network element for execution.

17 Claims, 16 Drawing Sheets

(56) References Cited

U.S. PATENT DOCUMENTS

| | | | | |
|---|---|---|---|---|
| 2015/0271706 | A1* | 9/2015 | Baboescu | H04W 28/0284 370/235 |
| 2017/0288952 | A1* | 10/2017 | Clark | H04L 41/0895 |
| 2017/0300255 | A1* | 10/2017 | Xu | G06F 12/0842 |
| 2021/0076261 | A1* | 3/2021 | Xin | H04W 28/10 |
| 2022/0210849 | A1* | 6/2022 | Xu | H04W 74/08 |
| 2023/0344717 | A1* | 10/2023 | Cao | H04W 24/04 |

FOREIGN PATENT DOCUMENTS

| | | | |
|---|---|---|---|
| CN | 111865872 | A | 10/2020 |
| EP | 3171629 | A1 | 5/2017 |
| JP | 2017528978 | A | 9/2017 |
| WO | 2020052416 | A1 | 3/2020 |

OTHER PUBLICATIONS

Anonymous:"O-RAN.WG1.Use-Cases-Detailed-Specification-v02.00." Apr. 1, 2020, total 47 pages.

3GPP TS 23.502 V16.7.0:"3rd Generation Partnership Project; Technical Specification Group Services and System Aspects; Procedures for the 5G System (5GS); Stage 2 (Release 16)", Dec. 2020, total 597 pages.

* cited by examiner

POLICY CONFLICT MANAGEMENT METHOD, APPARATUS, AND SYSTEM

CROSS-REFERENCE TO RELATED APPLICATIONS

This application is a continuation of International Patent Application No. PCT/CN2021/078487, filed on Mar. 1, 2021, which claims priority to International Patent Application No. PCT/CN2020/139884, filed on Dec. 28, 2020. The disclosures of the aforementioned priority applications are hereby incorporated by reference in their entirety.

TECHNICAL FIELD

This application relates to the field of communication technologies, and in particular, to a policy conflict management method, apparatus, and system.

BACKGROUND

With development of radio network technologies, automation and intelligence have been considered as an important development direction of a radio network in the future. For example, an open radio access network shown in FIG. 1 reconstructs a radio access network (RAN) based on a technology such as artificial intelligence (AI) or machine learning (ML), to implement automation and intelligence of the radio network. A radio access management controller in FIG. 1 may configure a policy for user equipment (UE).

In a current radio mobile network, a UE-level policy or UE-group-level policy is configured by a core network, and in a UE access or session access procedure, the core network sends a corresponding policy to a RAN. A RAN network element performs corresponding radio resource allocation and parameter configuration based on corresponding policy information.

Nevertheless, in the open radio access network, a policy conflict may occur between a UE policy configured by the radio access management controller and a UE policy configured by the core network. Currently, there is no optimization solution for resolving the policy conflict.

SUMMARY

Embodiments of this application provide a policy conflict management method, apparatus, and system, to avoid a policy conflict by using different implementations such as proactive preventive policy conflict processing or policy conflict feedback processing.

According to a first aspect, an embodiment of this application provides a policy conflict management method. The method is applied to a first controller and includes:

- receiving first policy information, where the first policy information includes a first policy configured by a core network for UE;
- detecting that a policy conflict occurs between the first policy information and second policy information, where the second policy information includes a second policy configured by a second controller for the UE, or a first decision result obtained after the first controller makes a policy decision according to the second policy;
- making a policy decision according to the first policy and the second policy, to obtain a second decision result; and
- sending the second decision result to a radio access network RAN network element, so that the RAN network element executes the second decision result.

In other words, in the method, the first controller is responsible for detecting a policy conflict. When detecting a policy conflict, the first controller may make a policy decision according to the first policy configured by the core network for the UE and the second policy configured by the second controller for the UE. This avoids generation of a UE policy with a policy conflict, ensures policy enforceability, and improves a policy execution success rate.

The first policy in the method may include information such as UE subscription information or QoS.

The second policy in the method may include information such as a policy type, a policy application object (Scope), and a policy target.

In a possible implementation, the receiving first policy information includes:

- receiving the first policy information through the RAN network element.

In other words, in this implementation, the first controller may obtain the policy information of the UE by using a signaling plane, and detect a policy conflict in a policy decision phase, to avoid generation of a UE policy with a policy conflict.

In a possible implementation, the receiving the first policy information through the RAN network element includes:

- sending a first subscription request message for subscription information of the UE to the RAN network element; and
- receiving a first subscription response message from the RAN network element, where the first subscription response message includes the first policy information.

In other words, in this implementation, a new parameter feature may be added to the signaling plane to support policy conflict detection, to avoid unnecessary signaling message interaction generated when a policy conflict occurs.

The first subscription request message in this implementation may include a UE identifier and a subscription information type. The UE identifier is used to identify target UE of requested subscription information. A value of the UE identifier may be one of an RNTI (radio network temporary identifier), a 5G-GUTI (globally unique temporary identifier), an IMEI (international mobile equipment identity), and the like, and this is not limited to these types, and may also be another UE identifier. The subscription information type (Subscription info type) indicates a type of requested subscription information. A value of the subscription information type may be one or more of an RRM (radio resource management) policy (RRM Policy), a service area restriction, a CSG (closed subscriber group), and a CAG (closed access group), and this is not limited to these types, and may also be another subscribed location information policy.

The first subscription response message in this implementation may include the UE identifier and specific parameter information of policy information of a subscription request, for example, one or more of an RRM policy, a service area restriction, a CSG, and a CAG, and this is not limited to these types, and may also be another subscribed location information policy.

In a possible implementation, the method further includes:

- receiving a first policy instance creation message from the second controller, where the first policy instance creation message includes the second policy.

In other words, in this implementation, the second controller may be responsible for configuring the second policy, and sending the second policy to the first controller. The first controller is responsible for detecting a policy conflict. When detecting a policy conflict, the first controller may make a policy decision according to the first policy configured by the core network for the UE and the second policy configured by the second controller for the UE. This avoids generation of a UE policy with a policy conflict, ensures policy enforceability, and improves a policy execution success rate.

The first policy instance creation message in this implementation may include information such as a policy type, a policy target, and a policy application object (Scope).

The policy target may be a QoE (quality of experience) target, that is, a QoE Target. The policy application object (Scope) may be one of a UE identifier list (UE ID list), a UE group identifier (UE group ID), and the like. For example, the UE group identifier may be an attribute feature identifier of a UE group such as a QCI (quality of service class identifier), a slice identifier (slice ID), and a location area.

For example, the Policy policy may be: a service offload policy, a service for a specific type, and when QoE of a current serving cell cannot meet a QoE target of the UE, the UE is handed over to a target cell that meets QoE of the service. The service offload policy is a policy type, the service for a specific type is a policy application object (Scope), and the QoE target is a policy target.

In a possible implementation, the method includes:

receiving the first policy information through the second controller.

In other words, in this implementation, the first controller may obtain the policy information of the UE by using a management plane interface service, and detect a policy conflict in a policy decision phase, to avoid generation of a UE policy with a policy conflict.

In a possible implementation, the receiving the first policy information through the second controller includes:

receiving a second policy instance creation message from the second controller, where the second policy instance creation message includes the first policy information and the second policy, and the first policy information is information received by the second controller from the core network through an operation, administration, and maintenance OAM entity.

In other words, in this implementation, the second controller may be responsible for configuring the second policy, and sending the first policy information to the first controller when sending the second policy to the first controller. In this way, the first controller is responsible for detecting a policy conflict. When detecting a policy conflict, the first controller may make a policy decision according to the first policy configured by the core network for the UE and the second policy configured by the second controller for the UE. This avoids generation of a UE policy with a policy conflict, ensures policy enforceability, and improves a policy execution success rate.

The first policy information in the second policy instance creation message in this implementation may be subscription information list information.

In a possible implementation, the first controller is a radio access intelligent controller, and the second controller is a radio access management controller.

In other words, in this implementation, the radio access management controller is responsible for configuring the second policy. The radio access intelligent controller is responsible for detecting a policy conflict. When detecting a policy conflict, the radio access intelligent controller may make a policy decision according to the first policy configured by the core network for the UE and the second policy configured by the second controller for the UE. This avoids generation of a UE policy with a policy conflict, ensures policy enforceability, and improves a policy execution success rate.

In a possible implementation, both the first controller and the second controller are radio access management controllers.

In other words, in this implementation, the radio access management controller is responsible for configuring the second policy, and detecting a policy conflict. When detecting a policy conflict, the radio access management controller may make a policy decision according to the first policy configured by the core network for the UE and the second policy configured by the second controller for the UE. This avoids generation of a UE policy with a policy conflict, ensures policy enforceability, and improves a policy execution success rate.

In a possible implementation, the receiving first policy information includes:

receiving the first policy information through an OAM entity.

In other words, in this implementation, the radio access management controller may obtain the policy information of the UE by using a management plane interface service, and detect a policy conflict in a policy decision phase, to avoid generation of a UE policy with a policy conflict.

In a possible implementation, the receiving the first policy information through an OAM entity includes:

sending a second subscription request message for subscription information of the UE to the core network through the OAM entity; and receiving a second subscription response message from the core network through the OAM entity, where the second subscription response message includes the first policy information.

In other words, in this implementation, the radio access management controller may add a new parameter feature to the management plane interface to support policy conflict detection, to avoid unnecessary signaling message interaction generated when a policy conflict is optimized.

The second subscription request message in this implementation may include a UE group identifier (UE group ID), a subscription information type, and an information update notification. The subscription information type indicates a type of requested subscription information, and a value of the subscription information type may be one or more of an RRM policy, a service area restriction, a CSG, a CAG, and the like, and this is not limited to these types, and may also be another subscribed location information policy. The UE group identifier may be an attribute feature identifier of a UE group such as a QCI (quality of service class identifier), a slice identifier (slice ID), and a location area. The information update notification is used to subscribe to an information update notification. To be specific, when the UE subscription information or QoS changes, a core network element is triggered to initiate an information update, and notify the radio access management controller of updated latest policy information.

In a possible implementation, the receiving first policy information includes:

receiving the first policy information through the RAN network element.

In other words, in this implementation, the radio access management controller may obtain the policy information of the UE by using a signaling plane, and detect a policy conflict in a policy decision phase, to avoid generation of a UE policy with a policy conflict.

In a possible implementation, the receiving the first policy information through the RAN network element includes:

sending a third subscription request message for the subscription information of the UE to the RAN network element through a radio intelligent management controller; and receiving a third subscription response message from the RAN network element through the radio intelligent management controller, where the third subscription response message includes the first policy information.

In other words, in this implementation, the radio access management controller may add a new parameter feature to the signaling plane to support policy conflict detection, to avoid unnecessary signaling message interaction generated when a policy conflict occurs.

The third subscription request message in this implementation may include a UE identifier and a subscription information type (Subscription info type). The UE identifier is used to identify target UE of requested subscription information. A value of the UE identifier may be one of an RNTI, a 5G-GUTI, an IMEI, and the like (this is not limited to these types, and may also be another UE identifier). The subscription information indicates requested subscription information. A value of the subscription information may be one or more of an RRM policy, a service area restriction, a CSG and a CAG, and this is not limited to these types, and may also be another subscribed location information policy.

The third subscription response message in this implementation may include the UE identifier and specific parameter information of policy information of a subscription request, for example, one or more of an RRM policy, a service area restriction, a CSG, and a CAG, this is not limited to these types, and may also be another subscribed location information policy.

According to a second aspect, an embodiment of this application provides a policy conflict management method. The method is applied to a first controller and includes:

receiving a first message from a radio access network RAN network element, where the first message includes policy conflict indication information, a UE identifier, and first policy information, the policy conflict indication information indicates that a policy conflict occurs between the first policy information and a first decision result, the first policy information includes a first policy configured by a core network for UE corresponding to the UE identifier, the first decision result is a decision result obtained after the first controller makes a policy decision according to a second policy, and the second policy is a policy configured by a second controller for the UE corresponding to the UE identifier;

making a policy decision according to the first policy and the second policy, to obtain a second decision result; and sending the second decision result to the RAN network element, so that the RAN network element executes the second decision result.

In other words, in the method, the RAN network element is responsible for detecting a policy conflict, and reporting a policy conflict when detecting a policy conflict. The first controller is responsible for making a policy decision according to the first policy configured by the core network for the UE and the second policy configured by the second controller for the UE, to avoid generation of a UE policy with a policy conflict. In particular, the RAN network element is enhanced to support policy conflict detection, and the radio access intelligent controller is supported in directionally obtaining corresponding UE policy information on which a policy conflict occurs, to obtain less unnecessary UE information, and reduce consumption of interface resources for data obtaining.

In a possible implementation, the method further includes:

receiving a policy instance creation message from the second controller, where the policy instance creation message includes the second policy.

In other words, in this implementation, the RAN network element is responsible for detecting a policy conflict. The second controller may be responsible for configuring the second policy, and sending the second policy to the first controller. The first controller is responsible for making a policy decision according to the first policy configured by the core network for the UE and the second policy configured by the second controller for the UE. This avoids generation of a UE policy with a policy conflict. In particular, the RAN network element is enhanced to support policy conflict detection, and the radio access intelligent controller is supported in directionally obtaining corresponding UE policy information on which a policy conflict occurs, to obtain less unnecessary UE information, and reduce consumption of interface resources for data obtaining.

In a possible implementation, the first controller is a radio access intelligent controller, and the second controller is a radio access management controller.

In other words, in this implementation, the RAN network element is responsible for detecting a policy conflict. The radio access management controller is responsible for configuring the second policy. The radio access intelligent controller is responsible for making a policy decision according to the first policy configured by the core network for the UE and the second policy configured by the second controller for the UE. This avoids generation of a UE policy with a policy conflict. In particular, the RAN network element is enhanced to support policy conflict detection, and the radio access intelligent controller is supported in directionally obtaining corresponding UE policy information on which a policy conflict occurs, to obtain less unnecessary UE information, and reduce consumption of interface resources for data obtaining.

In a possible implementation, both the first controller and the second controller are radio access management controllers.

In other words, in this implementation, the RAN network element is responsible for detecting a policy conflict. The radio access management controller is responsible for configuring the second policy and making a policy decision according to the first policy configured by the core network for the UE and the second policy configured by the second controller for the UE. This avoids generation of a UE policy with a policy conflict. In particular, the RAN network element is enhanced to support policy conflict detection, and the radio access intelligent controller is supported in directionally obtaining corresponding UE policy information on which a policy conflict occurs, to obtain less unnecessary UE information, and reduce consumption of interface resources for data obtaining.

According to a third aspect, an embodiment of this application provides a policy conflict management method. The method is applied to a radio access network RAN network element and includes:

receiving first policy information from a core network, where the first policy information includes a first policy configured by the core network for UE;

detecting that a policy conflict occurs between the first policy information and a first decision result, where the first decision result is a decision result obtained after a first controller makes a policy decision according to a second policy, and the second policy is a policy configured by a second controller for the UE;

sending a first message to the first controller, where the first message includes policy conflict indication information, a UE identifier of the UE, and the first policy information, and the policy conflict indication information indicates that a policy conflict occurs between the first policy information and the first decision result;

receiving a second decision result from the first controller, where the second decision result is a decision result obtained after the first controller makes a policy decision according to the first policy and the second policy; and executing the second decision result.

In other words, in this implementation, the RAN network element is responsible for detecting a policy conflict. The second controller may be responsible for configuring the second policy, and sending the second policy to the first controller. The first controller is responsible for making a policy decision according to the first policy configured by the core network for the UE and the second policy configured by the second controller for the UE. This avoids generation of a UE policy with a policy conflict. In particular, the RAN network element is enhanced to support policy conflict detection, and the radio access intelligent controller is supported in directionally obtaining corresponding UE policy information on which a policy conflict occurs, to obtain less unnecessary UE information, and reduce consumption of interface resources for data obtaining.

In a possible implementation, the first controller is a radio access intelligent controller, and the second controller is a radio access management controller.

In other words, in this implementation, the RAN network element is responsible for detecting a policy conflict. The radio access management controller is responsible for configuring the second policy. The radio access intelligent controller is responsible for making a policy decision according to the first policy configured by the core network for the UE and the second policy configured by the second controller for the UE. This avoids generation of a UE policy with a policy conflict. In particular, the RAN network element is enhanced to support policy conflict detection, and the radio access intelligent controller is supported in directionally obtaining corresponding UE policy information on which a policy conflict occurs, to obtain less unnecessary UE information, and reduce consumption of interface resources for data obtaining.

In a possible implementation, both the first controller and the second controller are radio access management controllers.

In other words, in this implementation, the RAN network element is responsible for detecting a policy conflict. The radio access management controller is responsible for configuring the second policy, and making a policy decision according to the first policy configured by the core network for the UE and the second policy. This avoids generation of a UE policy with a policy conflict.

In a possible implementation, the method further includes:

receiving the first decision result from the radio access management controller through a radio access intelligent controller.

In other words, in this implementation, the radio access intelligent controller is responsible for an information forwarding function. The radio access management controller is responsible for configuring the second policy and making a policy decision according to the first policy configured by the core network for the UE and the second policy. This avoids generation of a UE policy with a policy conflict.

According to a fourth aspect, an embodiment of this application provides a policy conflict management method. The method is applied to a radio access network RAN network element and includes:

obtaining a first decision result, where the first decision result is a decision result obtained after a first controller makes a policy decision according to a second policy, and the second policy is a policy configured by a second controller for user equipment UE;

sending the first decision result to a core network, so that the core network detects whether a policy conflict occurs between the first decision result and first policy information, where the first policy information includes a first policy configured by the core network for the UE; and receiving a policy conflict detection result from the core network, where the policy conflict detection result includes: a policy conflict occurs between the first decision result and the first policy information, or no policy conflict occurs between the first decision result and the first policy information.

In other words, in this implementation, the RAN network element is responsible for sending the first decision result on a controller side (for example, the first controller or the second controller) in an open radio access network to the core network. The core network is responsible for detecting a policy conflict, and returning a policy conflict detection result to the RAN network element. In this way, the RAN network element can learn, by using the policy conflict detection result, whether a policy conflict occurs between the first decision result and the first policy information. This avoids generation of a UE policy with a policy conflict, and ensures policy enforceability.

In a possible implementation, the first controller is a radio access intelligent controller, and the second controller is a radio access management controller; or both the first controller and the second controller are radio access management controllers.

In other words, in this implementation, the first controller and the second controller may be the same. For example, both the first controller and the second controller are radio access management controllers. Alternatively, the first controller may be different. For example, the first controller is a radio access intelligent controller, and the second controller is a radio access management controller.

In a possible implementation, the sending the first decision result to a core network includes:

adding the first decision result to a protocol data unit PDU session resource modification indication message or a policy modification request message; and sending the PDU session resource modification indication message or the policy modification request message to the core network, so that the core network obtains the first decision result from the PDU session resource modification indication message or the policy modification request message.

In other words, in this implementation, the first decision result may be sent to the core network by using the PDU session resource modification indication message or the policy modification request message. This improves flexibility of sending the first decision result.

In a possible implementation, the receiving a policy conflict detection result from the core network includes:

receiving a PDU session resource modification confirm message from the core network, where the PDU session resource modification confirm message includes the policy conflict detection result or indication information indicating the policy conflict detection result; and determining the policy conflict detection result based on the PDU session resource modification confirm message.

In other words, in this implementation, the policy conflict detection result or the indication information indicating the policy conflict detection result may be transmitted by using the PDU session resource modification confirm message, to improve reliability of information transmission.

In a possible implementation, the policy conflict detection result is that no policy conflict occurs between the first decision result and the first policy information; and the method further includes:

receiving a PDU session modification request message from the core network; and executing the first decision result based on the PDU session modification request message, and sending a PDU session modification response message to the core network.

In other words, in this implementation, when no policy conflict occurs between the first decision result and the first policy information, the core network may initiate UE policy modification, to ensure that policy information of the UE, the RAN, and the core network is consistent (that is, policy synchronization).

According to a fifth aspect, an embodiment of this application provides a policy conflict management method. The method is applied to a core network and includes:

receiving a first decision result from a radio access network RAN network element, where the first decision result is a decision result obtained after a first controller makes a policy decision according to a second policy, and the second policy is a policy configured by a second controller for user equipment UE;

detecting whether a policy conflict occurs between the first decision result and first policy information, where the first policy information includes a first policy configured by the core network for the UE; and sending a policy conflict detection result to the RAN network element, where the policy conflict detection result includes: a policy conflict occurs between the first decision result and the first policy information, or no policy conflict occurs between the first decision result and the first policy information.

In other words, in this implementation, the RAN network element is responsible for sending the first decision result on a controller side (for example, the first controller or the second controller) in an open radio access network to the core network. The core network is responsible for detecting a policy conflict, and returning a policy conflict detection result to the RAN network element. In this way, the RAN network element can learn, by using the policy conflict detection result, whether a policy conflict occurs between the first decision result and the first policy information. This avoids generation of a UE policy with a policy conflict, and ensures policy enforceability.

In a possible implementation, the first controller is a radio access intelligent controller, and the second controller is a radio access management controller; or both the first controller and the second controller are radio access management controllers.

In other words, in this implementation, the first controller and the second controller may be the same. For example, both the first controller and the second controller are radio access management controllers. Alternatively, the first controller may be different. For example, the first controller is a radio access intelligent controller, and the second controller is a radio access management controller.

In a possible implementation, the receiving a first decision result from a RAN network element includes:

receiving a protocol data unit PDU session resource modification indication message or a policy modification request message from the core network, where the PDU session resource modification indication message or the policy modification request message includes the first decision result; and obtaining the first decision result from the PDU session resource modification indication message or the policy modification request message.

In other words, in this implementation, the first decision result may be obtained by using the PDU session resource modification indication message or the policy modification request message, to enrich manners of obtaining the first decision result.

In a possible implementation, the sending a policy conflict detection result to the RAN network element includes:

adding the policy conflict detection result or indication information indicating the policy conflict detection result to a PDU session resource modification confirm message; and sending the PDU session resource modification confirm message to the RAN network element.

In other words, in this implementation, the policy conflict detection result or the indication information indicating the policy conflict detection result may be transmitted by using the PDU session resource modification confirm message, to improve reliability of information transmission.

In a possible implementation, the policy conflict detection result is that no policy conflict occurs between the first decision result and the first policy information; and the method further includes:

sending a PDU session modification request message to the RAN network element, so that the RAN network element executes the first decision result based on the PDU session modification request message.

In other words, in this implementation, when no policy conflict occurs between the first decision result and the first policy information, the core network may initiate UE policy modification, to ensure that policy information of the UE, the RAN, and the core network is consistent (that is, policy synchronization).

According to a sixth aspect, an embodiment of this application provides a policy conflict management apparatus. The apparatus is used in a first controller and includes:

a receiving module, configured to receive first policy information, where the first policy information includes a first policy configured by a core network for UE;

a detection module, configured to detect that a policy conflict occurs between the first policy information and second policy information, where the second policy information includes a second policy configured by a second controller for the UE, or a first decision result obtained after the first controller makes a policy decision according to the second policy;

a decision module, configured to make a policy decision according to the first policy and the second policy, to obtain a second decision result; and a sending module, configured to send the second decision result to a radio access network RAN network element, so that the RAN network element executes the second decision result.

According to a seventh aspect, an embodiment of this application provides a policy conflict management apparatus. The apparatus is used in a first controller and includes:

a message receiving module, configured to receive a first message from a radio access network RAN network element, where the first message includes policy conflict indication information, a UE identifier, and first policy information, the policy conflict indication information indicates that a policy conflict occurs between the first policy information and a first decision result, the first policy information includes a first policy configured by a core network for UE corresponding to the UE identifier, the first decision result is a decision result obtained after the first controller makes a policy decision according to a second policy, and the second policy is a policy configured by a second controller for the UE corresponding to the UE identifier;

a policy decision module, configured to make a policy decision according to the first policy and the second policy, to obtain a second decision result; and a policy sending module, configured to send the second decision result to the RAN network element, so that the RAN network element executes the second decision result.

According to an eighth aspect, an embodiment of this application provides a policy conflict management apparatus. The apparatus is used in a radio access network RAN network element and includes:

an information receiving module, configured to receive first policy information from a core network, where the first policy information includes a first policy configured by the core network for UE;

a conflict detection module, configured to detect that a policy conflict occurs between the first policy information and a first decision result, where the first decision result is a decision result obtained after a first controller makes a policy decision according to a second policy, and the second policy is a policy configured by a second controller for the UE;

a conflict sending module, configured to send a first message to the first controller, where the first message includes policy conflict indication information, a UE identifier of the UE, and the first policy information, and the policy conflict indication information indicates that a policy conflict occurs between the first policy information and the first decision result;

a decision receiving module, configured to receive a second decision result from the first controller, where the second decision result is a decision result obtained after the first controller makes a policy decision according to the first policy and the second policy; and a decision execution module, configured to execute the second decision result.

According to a ninth aspect, an embodiment of this application provides a policy conflict management apparatus. The apparatus is used in a radio access network RAN network element and includes:

an obtaining module, configured to obtain a first decision result, where the first decision result is a decision result obtained after a first controller makes a policy decision according to a second policy, and the second policy is a policy configured by a second controller for user equipment UE;

a decision result sending module, configured to send the first decision result to a core network, so that the core network detects whether a policy conflict occurs between the first decision result and first policy information, where the first policy information includes a first policy configured by the core network for the UE; and a conflict detection result receiving module, configured to receive a policy conflict detection result from the core network, where the policy conflict detection result includes: a policy conflict occurs between the first decision result and the first policy information, or no policy conflict occurs between the first decision result and the first policy information.

According to a tenth aspect, an embodiment of this application provides a policy conflict management apparatus. The apparatus is used in a core network and includes:

a decision result receiving module, configured to receive a first decision result from a radio access network RAN network element, where the first decision result is a decision result obtained after a first controller makes a policy decision according to a second policy, and the second policy is a policy configured by a second controller for user equipment UE;

a policy conflict detection module, configured to detect whether a policy conflict occurs between the first decision result and first policy information, where the first policy information includes a first policy configured by the core network for the UE; and a conflict detection result sending module, configured to send a policy conflict detection result to the RAN network element, where the policy conflict detection result includes: a policy conflict occurs between the first decision result and the first policy information, or no policy conflict occurs between the first decision result and the first policy information.

According to an eleventh aspect, an embodiment of this application provides a policy conflict management apparatus. The apparatus is used in a first controller and includes a processor, a memory, and a transceiver;

the memory is configured to store computer instructions; and when the policy conflict management apparatus runs, the processor executes the computer instructions, so that the policy conflict management apparatus performs the method according to the first aspect.

According to a twelfth aspect, an embodiment of this application provides a policy conflict management apparatus. The apparatus is used in a first controller and includes a processor, a memory, and a transceiver;

the memory is configured to store computer instructions; and when the policy conflict management apparatus runs, the processor executes the computer instructions, so that the policy conflict management apparatus performs the method according to the second aspect.

According to a thirteenth aspect, an embodiment of this application provides a policy conflict management apparatus. The apparatus is used in a radio access network RAN network element and includes a processor, a memory, and a transceiver;

the memory is configured to store computer instructions; and when the policy conflict management apparatus runs, the processor executes the computer instructions, so that the policy conflict management apparatus performs the method according to the third aspect.

According to a fourteenth aspect, an embodiment of this application provides a policy conflict management apparatus. The apparatus is used in a radio access network RAN network element and includes a processor, a memory, and a transceiver;

the memory is configured to store computer instructions; and when the policy conflict management apparatus runs, the processor executes the computer instructions, so that the policy conflict management apparatus performs the method according to the fourth aspect.

According to a fifteenth aspect, an embodiment of this application provides a policy conflict management apparatus. The apparatus is used in a core network and includes a processor, a memory, and a transceiver;

the memory is configured to store computer instructions; and when the policy conflict management apparatus runs, the processor executes the computer instructions, so that the policy conflict management apparatus performs the method according to the fifth aspect.

According to a sixteenth aspect, an embodiment of this application provides a policy conflict management system, including a first controller, a second controller, and a radio access network RAN network element. The first controller is configured to perform the method according to the first aspect.

According to a seventeenth aspect, an embodiment of this application provides a policy conflict management system, including a first controller, a second controller, and a radio access network RAN network element. The first controller is configured to perform the method according to the second aspect, and the RAN network element is configured to perform the method according to the third aspect.

According to an eighteenth aspect, an embodiment of this application provides a policy conflict management system, including a first controller, a second controller, a radio access network RAN network element, and a core network. The RAN network element is configured to perform the method according to the fourth aspect, and the core network is configured to perform the method according to the fifth aspect.

According to a nineteenth aspect, an embodiment of this application provides a computer storage medium. The computer storage medium includes computer instructions, and when the computer instructions are run, the method according to the first aspect, the method according to the second aspect, the method according to the third aspect, the method according to the fourth aspect, or the method according to the fifth aspect is enabled to be performed.

According to a twentieth aspect, an embodiment of this application provides a computer program product. The computer program product includes computer instructions, and when the computer instructions are run, the method according to the first aspect, the method according to the second aspect, the method according to the third aspect, the method according to the fourth aspect, or the method according to the fifth aspect is enabled to be performed.

According to the policy conflict management method, apparatus, and system provided in embodiments of this application, when a policy conflict is detected, a policy decision may be made according to the first policy configured by the core network for the UE and the second policy configured by the second controller for the UE. This avoids generation of a UE policy with a policy conflict, ensures policy enforceability, and improves a policy execution success rate.

BRIEF DESCRIPTION OF DRAWINGS

FIG. 12 is a schematic flowchart of a policy conflict management method according to an embodiment of this application;

DESCRIPTION OF EMBODIMENTS

The following describes technical solutions of embodiments in this application with reference to accompanying drawings. It is clear that the described embodiments are merely some but not all of embodiments of this application.

In the descriptions of this specification, "an embodiment", "some embodiments", or the like indicates that one or more embodiments of this application include a specific feature, structure, or characteristic described with reference to embodiments. Therefore, statements in this specification, such as "in an embodiment", "in some embodiments", "in some other embodiments", and "in other embodiments", that appear at different places do not necessarily mean a same embodiment. Instead, the statements mean "one or more but not all of the embodiments", unless otherwise specifically emphasized.

In the descriptions of this specification, "/" means "or" unless otherwise specified. For example, A/B may represent A or B. In this specification, "and/or" describes only an association relationship between associated objects and represents that three relationships may exist. For example, A and/or B may represent the following three cases: Only A exists, both A and B exist, and only B exists. In addition, in the descriptions in embodiments of this application, "a plurality of" means two or more.

In the descriptions of this specification, the terms "first" and "second" are merely intended for description, and shall not be understood as an indication or implication of relative importance or implicit indication of a quantity of indicated technical features. Therefore, a feature limited by "first" or "second" may explicitly or implicitly include one or more features. The terms "include", "comprise", "have", and variants of the terms all mean "include but are not limited to", unless otherwise specifically emphasized.

Figure 1:
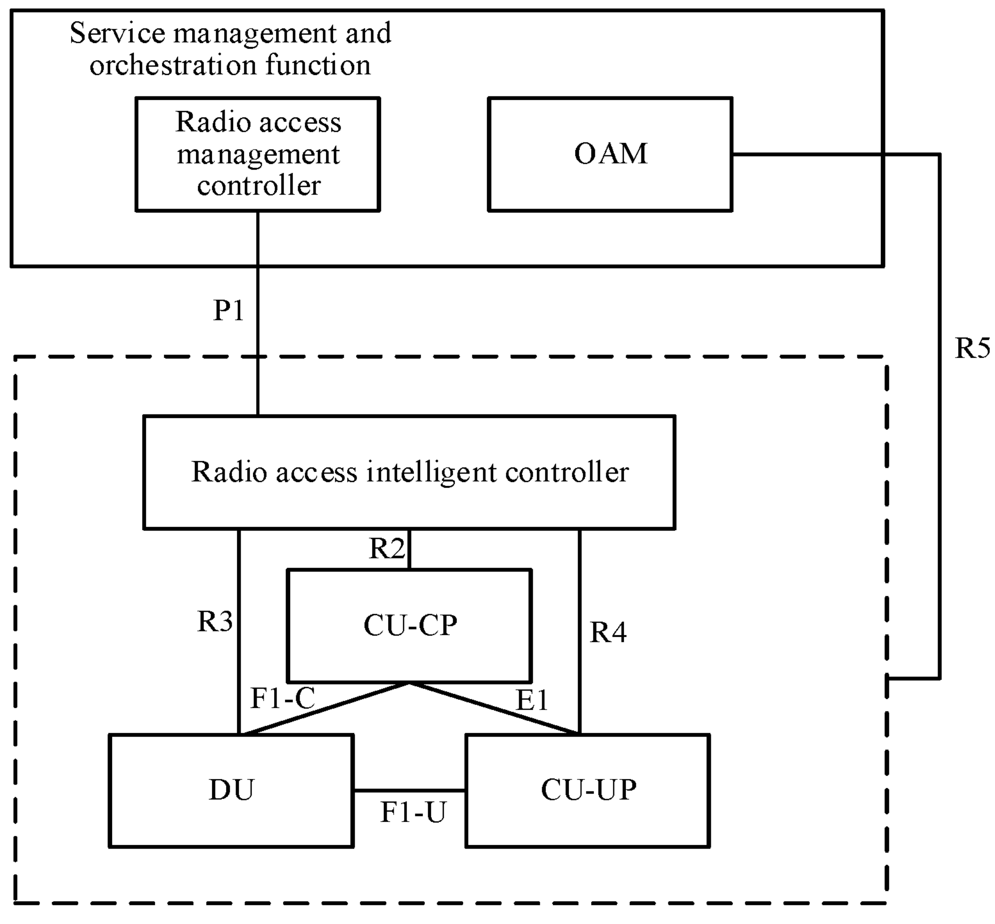
FIG. 1 is a schematic diagram of an architecture of an open radio access network.

With development of radio network technologies, automation and intelligence have been considered as an important development direction of a radio network in the future. For example, an open radio access network shown in FIG. 1 reconstructs a RAN network based on a technology such as AI or ML, to implement automation and intelligence of the radio network. Functions of main functional modules in FIG. 1 are described as follows:

A radio access management controller controls and optimizes latency-insensitive services of network elements and resources, executes AI or ML workflows, including model training and update, and manages an application or a feature according to a policy.

A radio access intelligent controller controls and optimizes RAN functional network elements and resources based on data collection and operation instructions over an R2, R3, or R4 interface. The R2 interface is used between the radio access intelligent controller and a CU (Central Unit, central unit)-CP (Control Plane, control plane). The R3 interface is used between the radio access intelligent controller and a DU (Distributed Unit, distributed unit). The R4 interface is used between the radio access intelligent controller and a CU-UP (User Plane, user plane).

A CU-CP is a central unit-control plane of a RAN, and implements RRC (radio resource control) protocol and PDCP (packet data convergence protocol) protocol control plane functions.

A CU-UP is a central unit-user plane of a RAN, and implements PDCP protocol user plane and service data adaptation protocol (SDAP) protocol functions.

A DU is a distributed unit of a RAN, and implements an RLC (radio link control)/MAC (media access control)/High-PHY (high physical layer) protocol function.

OAM (Operation Administration and Maintenance, operation, administration, and maintenance) provides operation and maintenance management for open RAN functional modules.

It should be noted that the radio access management controller in FIG. 1 may configure a policy for UE.

Figure 2:
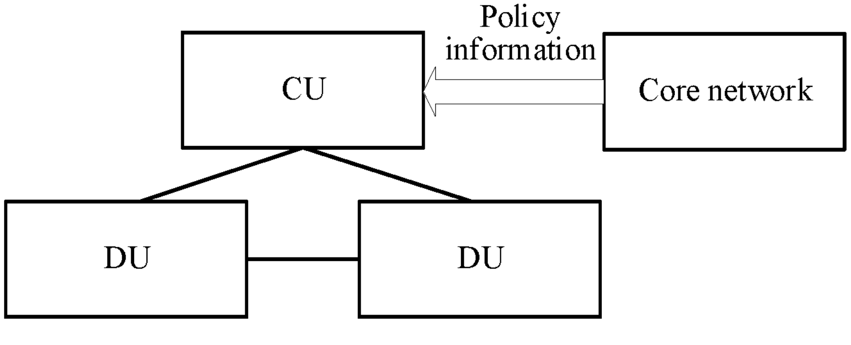
FIG. 2 is a schematic diagram of an architecture of a radio access network.

In a current radio mobile network, a UE-level policy or UE-group-level policy is configured by a core network, and in a UE access or session access procedure, the core network sends a corresponding policy to a RAN. A RAN network element performs corresponding radio resource allocation and parameter configuration based on corresponding policy information. For example, in a radio access network shown in FIG. 2, UE-level policy information obtained by a CU in a RAN from a core network is mainly subscribed policy information and dynamically generated policy information of each UE (Per-UE).

(1) The subscribed policy information may include: an RRM (radio resource management) policy, a service area restriction, a CSG (closed subscriber group) membership status, a CAG (closed access group), and the like.

(2) The dynamically generated policy information of each UE (Per-UE) may include a QoS (Quality of Service, quality of service) policy and the like.

The RRM policy may include a subscribed RFSP (reference signal received power). The service area restriction may include a handover restriction list (HO restriction List), a RAT (RAN access technology), and the like.

However, in an open radio access network, a policy conflict may occur between a UE policy configured by the radio access management controller and a UE policy configured by the core network. Currently, there is no optimization solution for resolving the policy conflict.

Therefore, to resolve a policy conflict that may occur between the UE policy configured by the radio access management controller and the UE policy configured by the core network, this application provides a policy conflict management method, apparatus, and system, to avoid a policy conflict by using different implementations such as proactive preventive policy conflict processing or policy conflict feedback processing.

It should be noted that the proactive preventive policy conflict processing may mean that the radio access management controller or the radio access intelligent controller is responsible for detecting a conflict, to avoid generation of a UE policy with a policy conflict, and ensure policy enforceability. A specific solution is as follows: The radio access management controller or the radio access intelligence controller obtains subscription information or QoS of corresponding UE from a core network, and the related subscription information or QoS corresponding to the UE is referenced when a policy decision is made, to avoid a policy conflict.

The policy conflict feedback processing may mean that the radio access management controller or the radio access intelligent controller makes a policy decision and delivers a policy operation to the CU-CP. The CU-CP detects a policy conflict based on the received policy operation and UE subscription or QoS. If a policy conflict occurs, policy conflict information and the UE subscription or QoS are reported. The radio access management controller or the radio access intelligent controller makes a policy decision again with reference to the UE subscription or QoS.

The following provides description by using specific embodiments.

Figure 3:
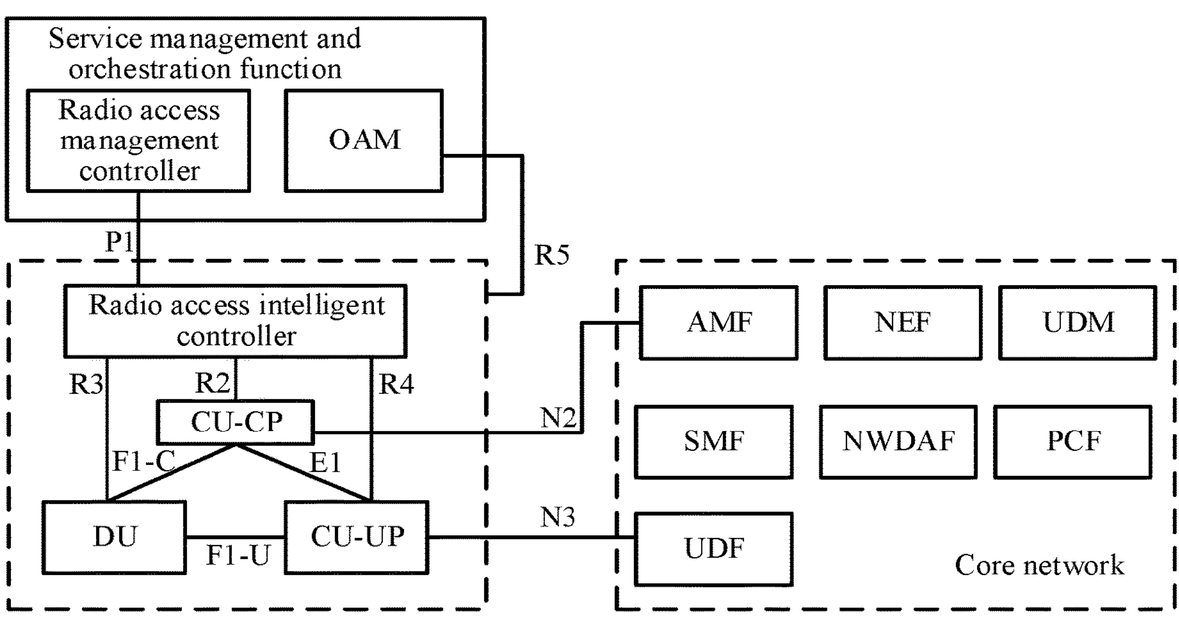
FIG. 3 is a schematic diagram of an architecture of an open radio access network.

FIG. 3 is a schematic diagram of an architecture of an open radio access network. As shown in FIG. 3, RAN network elements include a CU-CP, a CU-UP, and a DU. The core network includes the following network elements:

(1) AMF (Access and Mobility Management Function): is responsible for UE access control and mobility functions, including UE authentication, location area tracking, and the like.

(2) SMF (Session Management Function): is mainly responsible for PDU session management, including creation, modification, deletion, and the like.

(3) PCF (Policy Control function): is mainly responsible for policy management functions such as QoS and charging.

(4) UDM (Unified Data Management): is mainly responsible for managing data such as UE subscription information and a dynamic context.

(5) UPF (User Plane Function): is mainly responsible for functions such as user service data transmission and QoS monitoring.

(6) NWDAF (Network Data Analysis Function): is mainly responsible for analyzing core network data based on an ML model.

(7) NEF (Network Exposure Function): is mainly responsible for opening capability information of a network to a third-party device.

It should be noted that the radio access intelligent controller in FIG. 3 may be combined with the CU-CP. The network structure shown in FIG. 3 is for a case in which after the CU and the DU are separated, the CU is further separated into the CU-CP and the CU-UP. In addition, in addition to the case shown in FIG. 3, the policy conflict management method provided in this application may be further applied to a case in which the CU and the DU are separated shown in FIG. 4. Similarly, the policy conflict management method provided in this application may also be applied to a case in which RAN network elements are not separated. As shown in FIG. 5, the RAN network elements include a gNB (next generation node base station).

Figure 6:
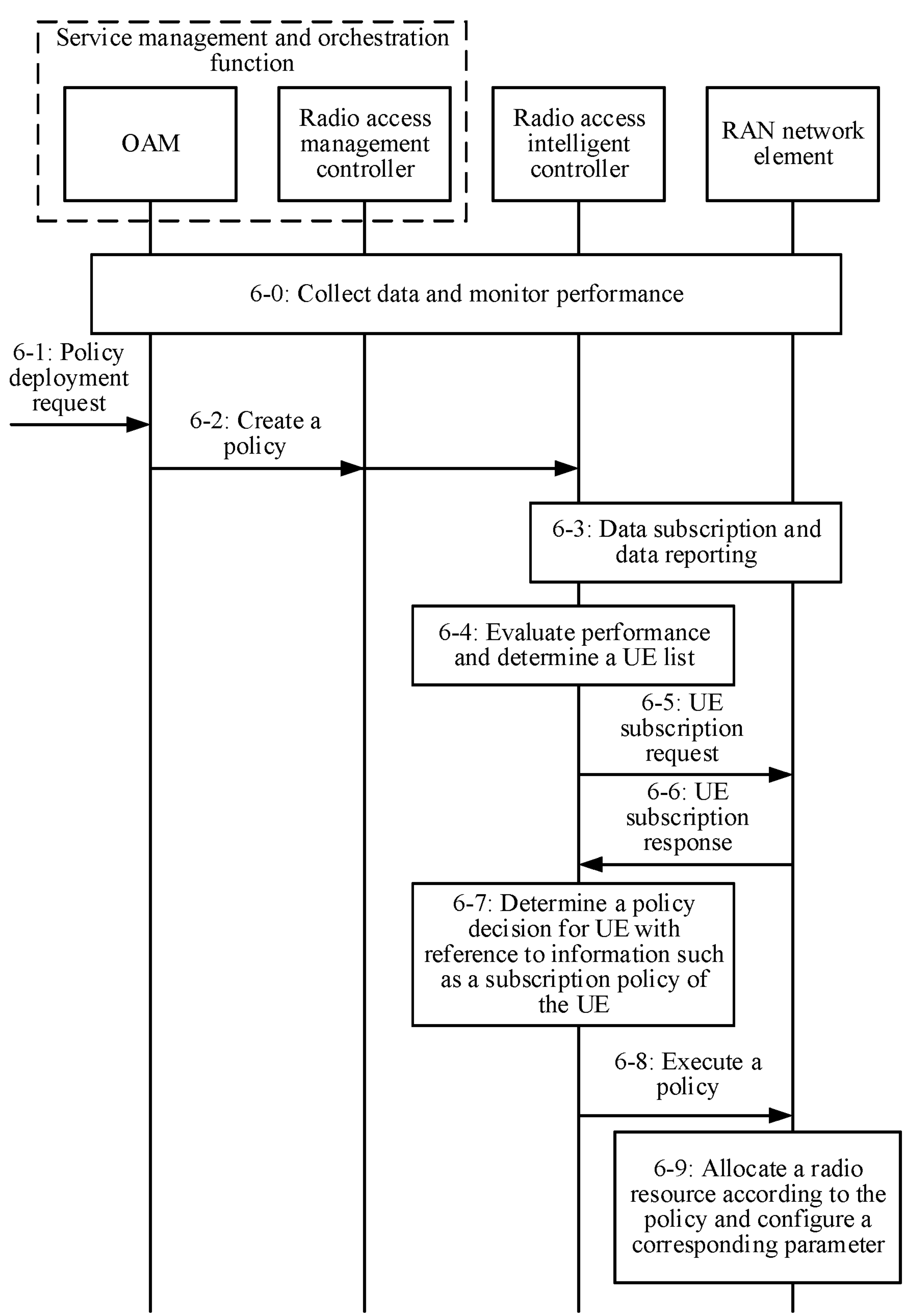
FIG. 6 is a schematic diagram of an implementation of policy conflict management.

FIG. 6 is a schematic diagram of an implementation of policy conflict management. As shown in FIG. 6, the implementation of policy conflict management is proactive preventive policy conflict processing. That is, a radio access intelligent controller obtains, from a RAN by using a signaling plane procedure, UE policy information (including UE subscription or QoS information) delivered by a core network to the RAN, and determines a final optimization measure for UE with reference to the obtained policy information and policy information delivered by a radio access management controller, to avoid a policy conflict.

The specific implementation process includes the following steps.

Step 6-0: OAM may collect performance data from a RAN network element (for example, the CU-CP, the CU-UP, and the DU in FIG. 3, the CU and the DU in FIG. 4, or the gNB in FIG. 5) based on a management plane performance management procedure. The RAN network element that can provide the performance data may be the CU-CP, the CU-UP, and the DU in FIG. 3, or may be the CU and the DU in FIG. 4, or may be the gNB in FIG. 5.

Step 6-1: The OAM receives an externally input management request, that is, a policy deployment request. The policy deployment request may include information such as a policy type, a policy target, and a policy application object (Scope).

The policy target may be a QoE (quality of experience) target, that is, a QoE target. The policy application object (Scope) may be one of a UE identifier list (UE ID list), a UE group identifier (UE group ID), and the like. For example, the UE group identifier may be an attribute feature identifier of a UE group such as a QCI (quality of service class identifier), a slice identifier (slice ID), and a location area.

For example, the Policy policy may be: a service offload policy, a service for a specific type, and when QoE of a current serving cell cannot meet a QoE target of the UE, the UE is handed over to a target cell that meets QoE of the service. The service offload policy is a policy type, the service for a specific type is a policy application object (Scope), and the QoE target is a policy target.

Step 6-2: After receiving the policy deployment request, the OAM instructs, through an internal interface, the radio access management controller to create a policy instance. The radio access management controller performs modeling on the policy in step 6-1 according to a policy model of a P1 interface, and sends a policy instance creation request message to the radio access intelligent controller through the P1 interface. The message includes the information such as the policy type, the policy application object (Scope), and the policy target (QoE Target) in step 6-1.

It should be noted that the OAM and the radio access management controller are logically two different functional modules, and may also be separately used as independent network elements. For example, the radio access management controller is integrated in a service management and orchestration function. The OAM is a general name of a management network element, and may be specifically implemented by management network elements such as an ONAP (Open Networking Automation Platform) and an NMS (network management system). The policy conflict management solution provided in this application is also applicable to a deployment scenario in which the radio access management controller and the OAM are independent of each other.

Step 6-3: The radio access intelligent controller receives the policy information sent by the radio access management controller, and determines, based on a policy decision requirement, data that needs to be collected from the RAN, that is, sends a data subscription request message to the RAN network element (for example, the CU-CP, the CU-UP, and the DU in FIG. 3, or the CU and the DU in FIG. 4, or the gNB in FIG. 5) through an R2 or R3 or R4 interface. The request message may include information such as a request data type, and the request data type may include UE performance data, cell performance data, and UE signal measurement data. The UE signal measurement data may include measured signal quality, for example, RSRP (reference signal received power) and RSRQ (reference signal received quality).

Figure 4:
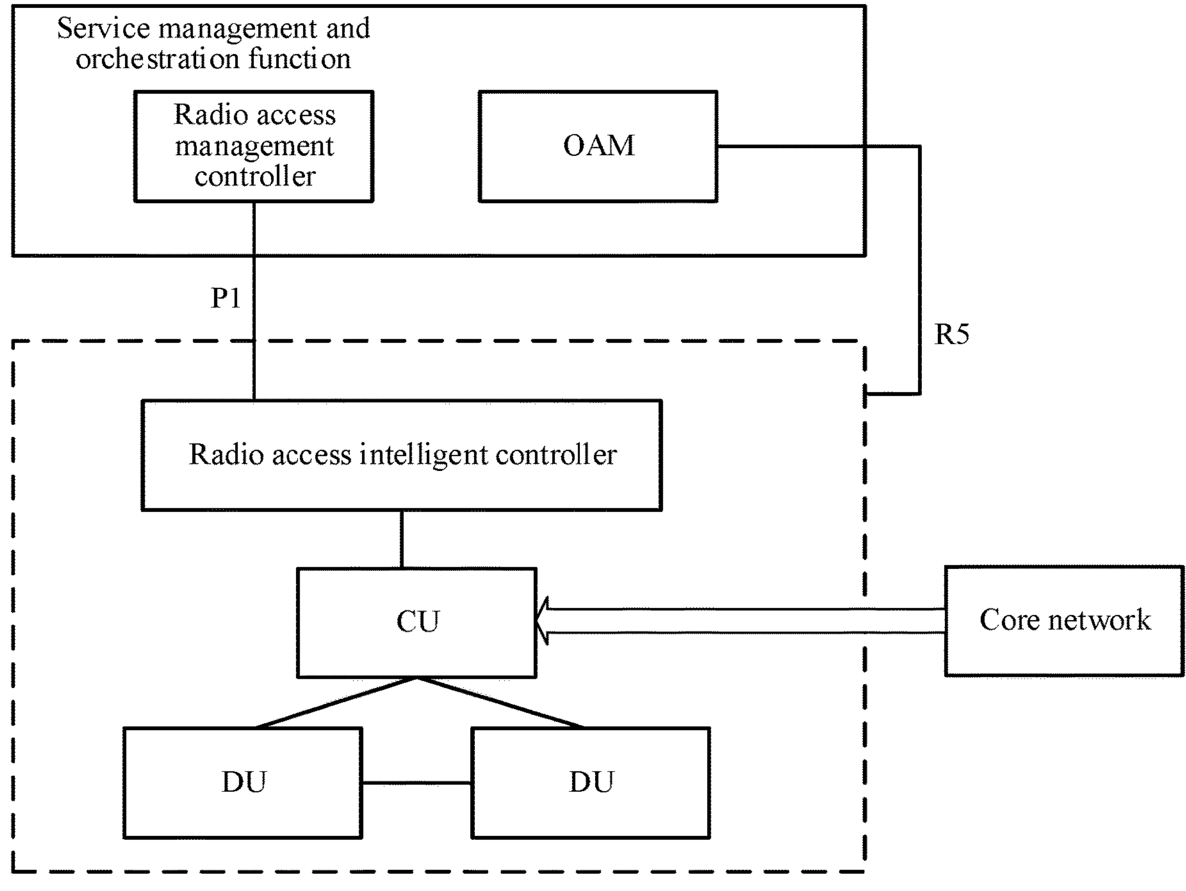
FIG. 4 is a schematic diagram of an architecture of an open radio access network.
Figure 5:
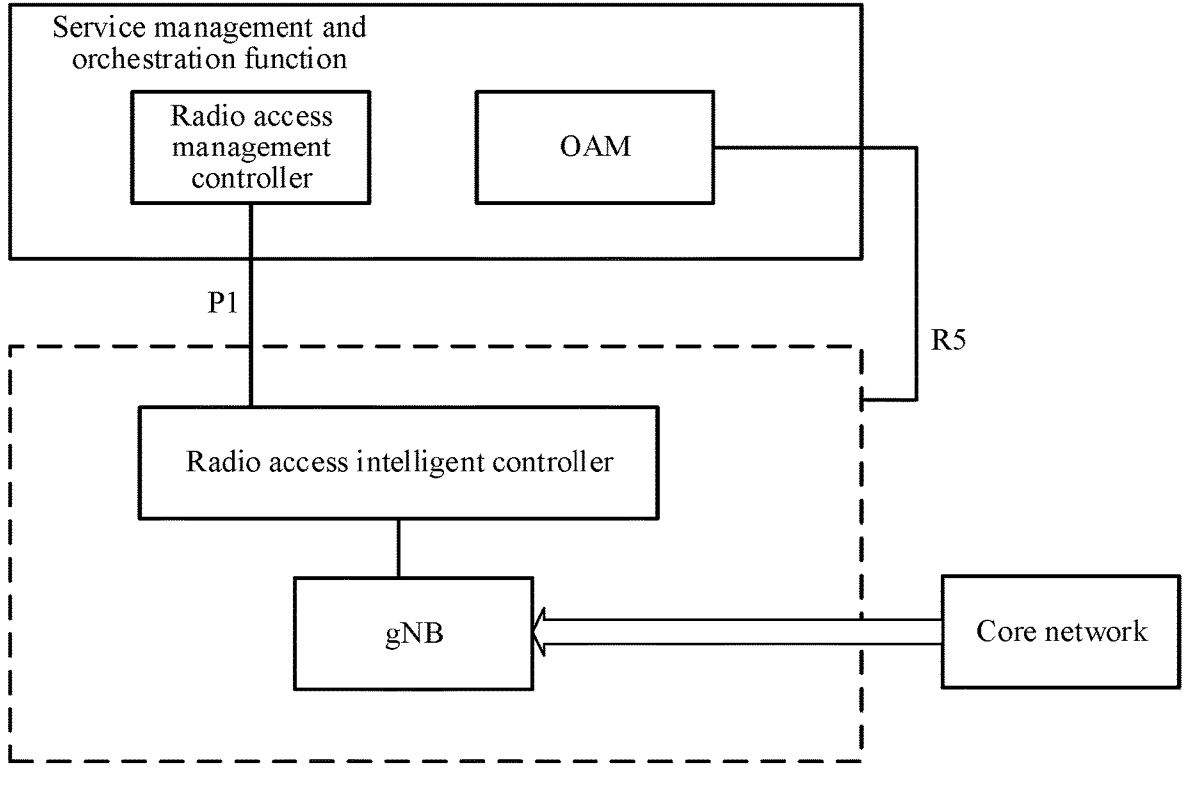
FIG. 5 is a schematic diagram of an architecture of an open radio access network.

It should be noted that in this application, a network architecture of the RAN may be shown in FIG. 3, FIG. 4, or FIG. 5. Correspondingly, the RAN network element configured to request data subscription may be the CU-CP, the CU-UP, and the DU in FIG. 3, or may be the CU and the DU in FIG. 4, or may be the gNB in FIG. 5.

After collecting subscription data, the RAN network element (for example, the CU-CP, the CU-UP, and the DU in FIG. 3, the CU and the DU in FIG. 4, or the gNB in FIG. 5) reports the UE performance data, the cell performance data, and the UE signal measurement data to the radio access intelligent controller by using a data report message of the R2, R3, or R4 interface.

Step 6-4: The radio access intelligent controller calculates current QoE of the UE based on the UE performance data, and analyzes whether the current QoE meets the policy target (QoE Target) in the policy delivered in step 6-2. If the current QoE does not meet the policy target (QoE Target), the radio access intelligent controller determines that the UE needs to be handed over, and determines a UE list if QoE of UE does not meet the QoE target.

After determining the UE that needs to be handed over or the UE list, the radio access intelligent controller further needs to determine a target cell to which the UE is to be handed over. Therefore, the radio access intelligent controller needs to evaluate performance of a neighboring cell of a current cell serving the UE, and then finds a target cell that meets the QoE target. Accordingly, the radio access intelligent controller predicts performance (QoE Predicted) of the neighboring cell based on the UE performance data, performance data of the neighboring cell, and the UE signal measurement data, and further determines, based on the performance QoE of the neighboring cell, a neighboring cell that can meet the service QoE target of the UE as a candidate target cell.

It should be noted that, in the radio access intelligent controller, the services of calculating the current QoE of the UE, predicting the QoE of the neighboring cell, and determining the target cell based on the QoE may be completed by different internal functional modules (these modules can be deployed independently to form independent network elements), or may be implemented by a unified functional module. This is not limited in this application.

Step 6-5: To avoid a conflict between the determined target cell and a related policy in subscription information of the UE, the radio access intelligent controller requests the subscription information of the UE from the RAN network element (for example, the CU-CP in FIG. 3, the CU in FIG. 4, or the gNB in FIG. 5) through the R2 interface. For example, the radio access intelligent controller sends a UE subscription request message to the CU-CP in FIG. 3. The UE subscription request message includes a UE identifier and a subscription information type.

The UE identifier is used to identify target UE of requested subscription information. A value of the UE identifier may be one of an RNTI (radio network temporary identifier), a 5G-GUTI (globally unique temporary identifier), and an IMEI (international mobile equipment identity), and this is not limited to these types, and may also be another UE identifier.

The subscription information type (Subscription info type) indicates a type of requested subscription information. A value of the subscription information type may be one or more of an RRM (radio resource management) policy (RRM Policy), a service area restriction, a CSG (Closed Subscriber Group, closed subscriber group), and a CAG (closed access group, this is not limited to these types, and may also be another subscribed location information policy.

Step 6-6: The RAN network elements (for example, the CU-CP in FIG. 3, the CU in FIG. 4, or the gNB in FIG. 5) searches locally stored policy information delivered by the core network, and returns the requested policy information to the radio access intelligent controller. For example, the CU-CP in FIG. 3 returns a UE subscription response message to the radio access intelligent controller. The message carries the UE identifier and specific parameter information of the policy information requested in step 6-5, for example, one or more of the RRM policy, the service area restriction, the CSG, and the CAG, and this is not limited to these types, and may also be another subscribed location information policy.

Step 6-7: The radio access intelligent controller determines, with reference to the policy information obtained in step 6-6, whether the candidate target cell determined in step 6-5 meets a subscription policy of the UE; and if a conflict occurs between the candidate target cell and the subscription policy of the UE, returns to step 6-4 to select another cell that meets the QoE target requirement of the UE as the target cell, and performs policy conflict detection again; or if no conflict occurs, performs step 6-8.

Step 6-8: The radio access intelligent controller sends a policy execution operation instruction message to the RAN network element (for example, the CU-CP in FIG. 3, the CU in FIG. 4, or the gNB in FIG. 5) through the R2 interface. The message includes the UE identifier (UE ID), a target cell identifier (Target cell ID), and an action type being a handover indication (HO indication). For example, the radio access intelligent controller in FIG. 3 sends the policy execution operation instruction message to the CU-CP through the R2 interface. The radio access intelligent controller in FIG. 4 sends the policy execution operation instruction message to the CU. The radio access intelligent controller in FIG. 5 sends the policy execution operation instruction message to the gNB.

Step 6-9: The RAN network element (for example, the CU-CP in FIG. 3, the CU in FIG. 4, or the gNB in FIG. 5) executes, according to the policy execution operation instruction in step 6-8, a handover processing procedure for the UE corresponding to the UE identifier, and hand over the UE to the target cell corresponding to the target cell identifier (Target cell ID). A specific handover processing procedure is not described in this application. For example, after the CU-CP in FIG. 3 receives the policy execution operation instruction from the radio access intelligent controller, the CU-CP performs a handover processing procedure for the UE corresponding to the UE identifier. After the CU in FIG. 4 receives the policy execution operation instruction from the radio access intelligent controller, the CU executes a handover processing procedure for the UE corresponding to the UE identifier. After the gNB in FIG. 5 receives the policy execution operation instruction from the radio access intelligent controller, the gNB performs a handover processing procedure for the UE corresponding to the UE identifier.

It can be learned that in this embodiment of this application, the radio access management controller is responsible for configuring a UE policy. The RAN network element (for example, the CU-CP in FIG. 3, the CU in FIG. 4, or the gNB in FIG. 5) is responsible for providing a UE policy configured by the core network. The radio access intelligent controller is responsible for detecting a policy conflict.

In other words, the radio access intelligent controller obtains the policy information of the UE by using a signaling plane, and detects a policy conflict in a policy decision phase, to avoid generation of a UE policy with a policy conflict. In particular, the radio access intelligent controller may add a new parameter feature through the R2 interface to support policy conflict detection, to avoid unnecessary signaling message exchange generated when a policy conflict occurs.

Figure 7:
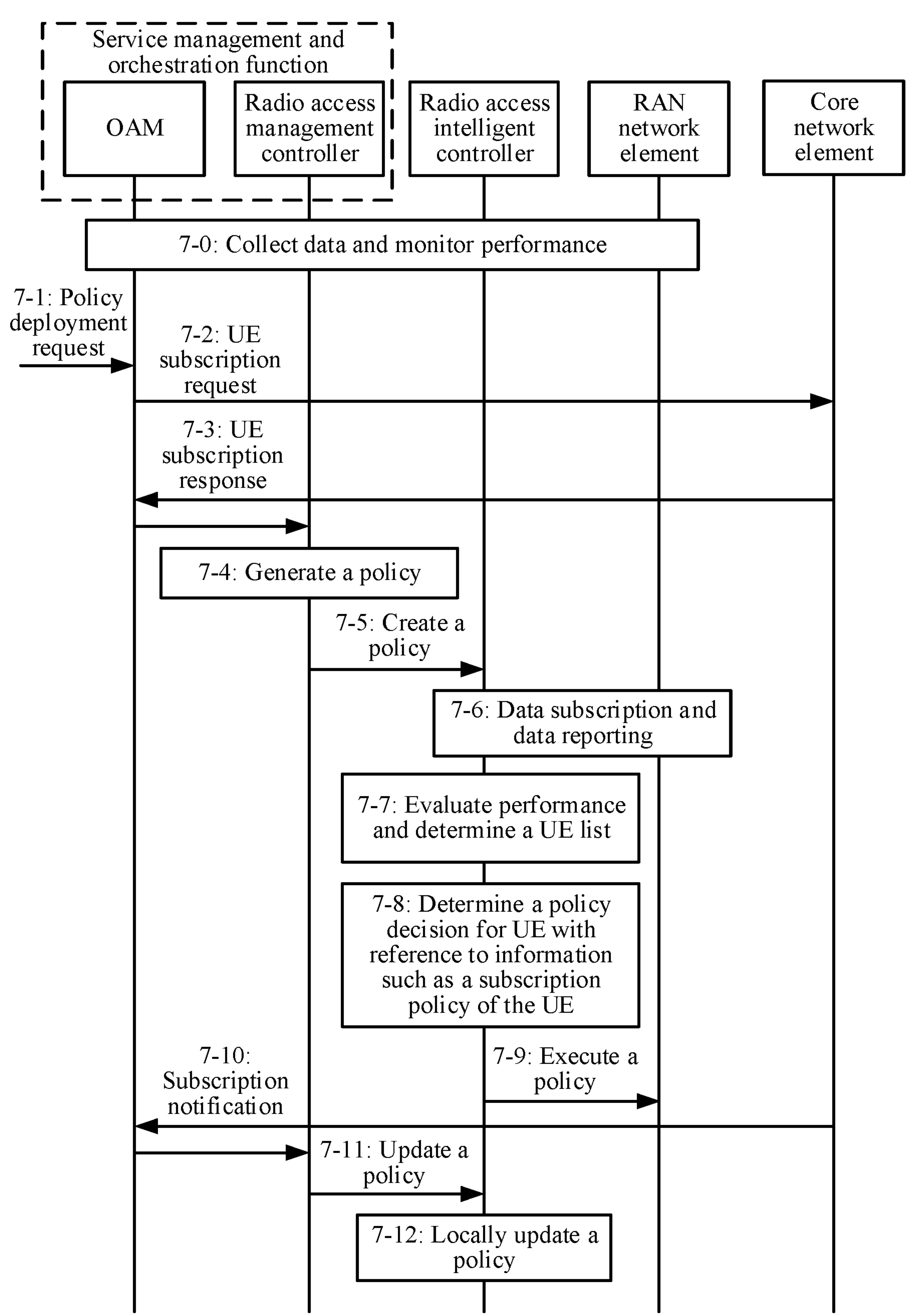
FIG. 7 is a schematic diagram of an implementation of policy conflict management.

FIG. 7 is a schematic diagram of an implementation of policy conflict management. As shown in FIG. 7, the implementation of policy conflict management is proactive preventive policy conflict processing. That is, a radio access management controller directly obtains related UE policy information (including UE subscription or QoS information) from a core network by using a management plane procedure, and sends the information to a radio access intelligent controller when creating a policy instance. The radio access intelligent controller determines a final optimization measure for UE with reference to the obtained policy information and the policy information delivered by the radio access management controller, to avoid a policy conflict.

The specific implementation process includes the following steps.

Step 7-0: OAM may collect performance data from a RAN network element (for example, the CU-CP, the CU-UP, and the DU in FIG. 3, the CU and the DU in FIG. 4, or the gNB in FIG. 5) based on a management plane performance management procedure. The RAN network element that can provide the performance data may be the CU-CP, the CU-UP, and the DU in FIG. 3, or may be the CU and the DU in FIG. 4, or may be the gNB in FIG. 5.

Step 7-1: The OAM receives an externally input management request, that is, a policy deployment request. The policy deployment request may include information such as a policy type (Policy Type), a policy target, and a policy application object (Scope).

The policy target may be a QoE (quality of experience) target. The policy application object (Scope) may be one of a UE identifier list (UE ID list), a UE group identifier (UE group ID), and the like. For example, the UE group identifier may be an attribute feature identifier of a UE group such as a QCI (quality of service class identifier), a slice identifier (slice ID), and a location area.

For example, the Policy policy may be: a service offload policy, a service for a specific type, and when QoE of a current serving cell cannot meet a QoE target of the UE, the UE is handed over to a target cell that meets QoE of the service. The service offload policy is a policy type, the service for a specific type is a policy application object (Scope), and the QoE target is a policy target.

Step 7-2: The radio access management controller receives external policy deployment, and obtains policy application object (Scope) information from a deployed policy, for example, obtains a UE group identifier (UE group ID). Further, the radio access management controller queries, from a core network element through a management service interface between the OAM and the core network element, subscription information or QoS corresponding to all UEs that subscribe to the UE group identifier (UE group ID).

A UE subscription request message includes the UE group identifier (UE group ID), a subscription information type, and an information update notification (InfoUpdateNotify Indication).

The subscription information type indicates a type of requested subscription information. A value of the subscription information type may be one or more of an RRM policy (RRM Policy), a service area restriction type, a CSG, and a CAG, and this is not limited to these types, and may also be another subscribed location information policy.

The UE group identifier may be an attribute feature identifier of a UE group such as a QCI (quality of service class identifier), a slice identifier (slice ID), and a location area.

The information update notification (InfoUpdateNotify Indication) is used to subscribe to an information update notification. To be specific, when the UE subscription information or QoS changes, the core network element is triggered to initiate an information update, and notify the radio access management controller of updated latest policy information. The information update notification in this application is merely an example message, and may alternatively be implemented by using another message. This is not limited in this application.

It should be noted that the core network element configured to provide the related UE policy information may be at least one of the NEF, the NWDAF, the UDM, the AMF, and the SMF in the core network shown in FIG. 3. In other words, in addition to the NEF and the NWDAF, the radio access management controller may further obtain the related UE policy information from the AMF, the SMF, or the UDM based on a management plane interface service. This is not limited in this application.

Step 7-3: The core network element queries the UDM to confirm UE related to the UE group identifier (UE group ID), further queries subscription information or QoS of the corresponding UE, and returns the information, that is, a subscription information list (subscriptionInfo list), to the radio access management controller. The subscription information list (subscriptionInfo list) is a set of information pairs of [UE identifier, QoS, RRM policy, service area restrictions, CSG, and CAG].

Step 7-4: The radio access management controller performs modeling on the policy in step 7-1 according to a policy model of a P1 interface, to generate a P1 interface policy.

Step 7-5: The radio access management controller sends a policy instance creation request message to the radio access intelligent controller through the P1 interface. The message includes information such as the policy type, the policy application object (Scope), and the policy target in step 7-1, and includes the UE subscription information or QoS obtained in step 7-3. That is, the policy instance creation message includes the subscription information list information.

Step 7-6: The radio access intelligent controller receives the policy information sent by the radio access management controller, and determines, based on a policy decision requirement, data that needs to be collected from the RAN, that is, sends a data subscription request message to the RAN network element (for example, the CU-CP, the CU-UP, and the DU in FIG. 3, or the CU and the DU in FIG. 4, or the gNB in FIG. 5) through an R2 or R3 or R4 interface. The request message may include information such as a request data type, and the request data type may include UE performance data, cell performance data, and UE signal measurement data. The UE signal measurement data may include measured signal quality, such as RSRP and RSRQ.

It should be noted that in this application, a network architecture of the RAN may be shown in FIG. 3, FIG. 4, or FIG. 5. Correspondingly, the RAN network element configured to request data subscription may be the CU-CP, the CU-UP, and the DU in FIG. 3, or may be the CU and the DU in FIG. 4, or may be the gNB in FIG. 5.

After collecting subscription data, the RAN network element (for example, the CU-CP, the CU-UP, and the DU in FIG. 3, the CU and the DU in FIG. 4, or the gNB in FIG. 5) reports the UE performance data, the cell (cell) performance data, and the UE signal measurement data to the radio access intelligent controller by using a data report message of the R2, R3, or R4 interface.

Step 7-7: The radio access intelligent controller calculates current QoE of the UE based on the UE performance data, and analyzes whether the current QoE meets the policy target (QoE Target) in the policy delivered in step 7-5. If the current QoE does not meet the policy target (QoE Target), the radio access intelligent controller determines that the UE needs to be handed over, and determines a UE list if QoE of UE does not meet the QoE target.

After determining the UE that needs to be handed over or the UE list, the radio access intelligent controller further needs to determine a target cell to which the UE is to be handed over. Therefore, the radio access intelligent controller needs to evaluate performance of a neighboring cell of a current cell serving the UE, and then finds a target cell that meets the QoE target. Accordingly, the radio access intelligent controller predicts performance (QoE Predicted) of the neighboring cell based on the UE performance data, performance data of the neighboring cell, and the UE signal measurement data, and further determines, based on the performance QoE of the neighboring cell, a neighboring cell that can meet the service QoE target of the UE as a candidate target cell.

It should be noted that, in the radio access intelligent controller, the services of calculating the current QoE of the UE, predicting the QoE of the neighboring cell, and determining the target cell based on the QoE may be completed by different internal functional modules. These modules can be deployed independently to form independent network elements, or may be implemented by a unified functional module. This is not limited in this application.

Step 7-8: The radio access intelligent controller determines, with reference to the policy information obtained in step 7-5, whether an optimization policy decision determined in step 7-7 meets a subscription policy of the UE; and if a conflict occurs between the optimization policy decision and the subscription policy of the UE, returns to step 7-7 to select another optimization policy decision that meets a policy target requirement, and performs policy conflict detection again; or if no conflict occurs, performs step 7-9. If a plurality of selected optimization policy decisions conflict with the policy information obtained in step 7-5, and no optimization policy decision meets the policy target, the procedure ends.

Step 7-9: The radio access intelligent controller sends a policy execution operation instruction message to the RAN network element (for example, the CU-CP in FIG. 3, the CU in FIG. 4, or the gNB in FIG. 5) through the R2 interface. The RAN network element (for example, the CU-CP in FIG. 3, the CU in FIG. 4, or the gNB in FIG. 5) performs, according to the policy execution operation instruction sent by the radio access intelligent controller, an optimization processing procedure for specified UE, for example, reallocates a radio resource to the UE, and configures a corresponding parameter. For example, the radio access intelligent controller in FIG. 3 sends the policy execution operation instruction message to the CU-CP through the R2 interface. After the CU-CP receives the policy execution operation instruction from the radio access intelligent controller, the CU-CP performs a handover processing procedure for the UE corresponding to the UE identifier. The radio access intelligent controller in FIG. 4 sends the policy execution operation instruction message to the CU. After the CU receives the policy execution operation instruction from the radio access intelligent controller, the CU executes a handover processing procedure for the UE corresponding to the UE identifier. The radio access intelligent controller in FIG. 5 sends the policy execution operation instruction message to the gNB. After the gNB receives the policy execution operation instruction from the radio access intelligent controller, the gNB performs a handover processing procedure for the UE corresponding to the UE identifier.

Step 7-10: When the UE policy information of the core network changes, the core network element (for example, the NEF or the NWDAF) sends an information update notification to the radio access management controller by using the management plane interface service, and sends updated UE policy information (subscriptionInfo list) to the radio access management controller. Only information about a UE whose information changes may be sent in the updated UE policy information (subscriptionInfo list), and information about all UEs identified by the UE group identifier (UE group ID) does not need to be sent. In addition, the information update notification herein is merely an example message, and may alternatively be implemented by using another message. This is not limited in this application.

Step 7-11: The radio access management controller determines a managed P1 interface policy instance, and sends the updated UE policy information to the corresponding radio access intelligent controller through the P1 interface.

Step 7-12: The radio access intelligent controller locally updates stored policy information, that is, updates the latest policy information to a local policy.

It can be learned that in this embodiment of this application, the radio access management controller is responsible for configuring a UE policy. The OAM is responsible for providing a UE policy configured by the core network. The radio access intelligent controller is responsible for detecting a policy conflict.

In other words, the radio access intelligent controller obtains UE policy information based on the management plane interface service by using the radio access management controller, and detects a policy conflict in an optimization policy decision phase, to avoid generation of a UE policy with a policy conflict. In particular, the radio access intelligent controller may add a new parameter feature through the management plane interface to support policy conflict detection, to avoid unnecessary signaling message exchange generated when a policy conflict is optimized.

Figure 8:
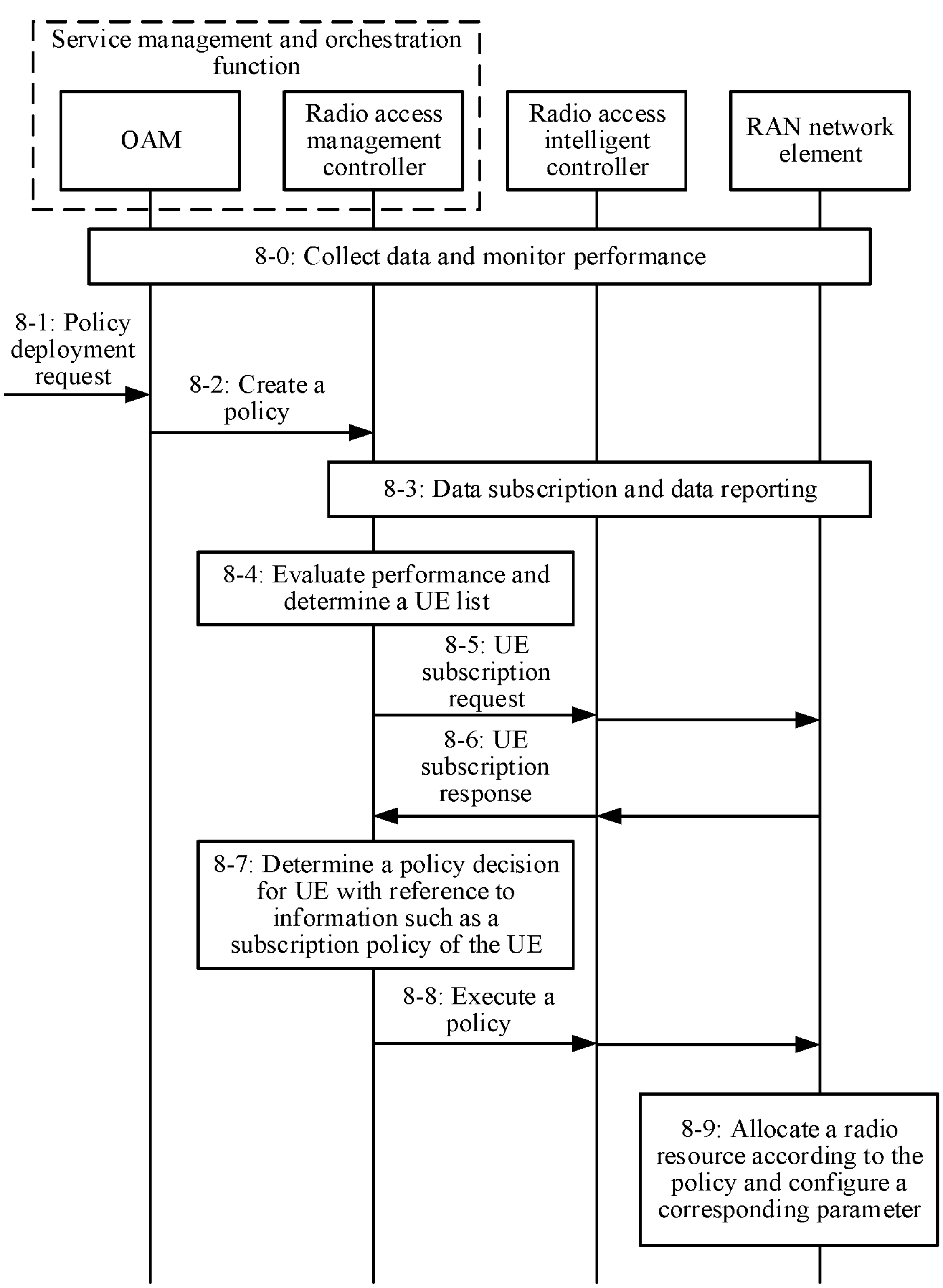
FIG. 8 is a schematic diagram of an implementation of policy conflict management.

FIG. 8 is a schematic diagram of an implementation of policy conflict management. As shown in FIG. 8, the implementation of policy conflict management is proactive preventive policy conflict processing. That is, a radio access management controller obtains, from a RAN by using a signaling plane procedure, UE policy information (including UE subscription or QoS information) delivered by a core network to the RAN, and determines a final optimization measure for UE with reference to the obtained policy information and UE policy information configured by the radio access management controller, to avoid a policy conflict. A specific implementation process is similar to that in FIG. 6. That is, a function implemented by a radio access intelligent controller is implemented by the radio access management controller, and details are not described herein again.

It can be learned that in this embodiment of this application, a RAN network element (for example, the CU-CP in FIG. 3, the CU in FIG. 4, or the gNB in FIG. 5) is responsible for providing a UE policy configured by the core network. The radio access intelligent controller is responsible for an information forwarding function. The radio access management controller is responsible for configuring a UE policy and detecting a policy conflict.

In other words, the radio access management controller obtains the UE policy information by using a signaling plane, and detects a policy conflict in a policy decision phase, to avoid generation of a UE policy with a policy conflict. In particular, the radio access management controller may add a new parameter feature through the R2 interface to support policy conflict detection, to avoid unnecessary signaling message exchange generated when a policy conflict occurs.

Figure 9:
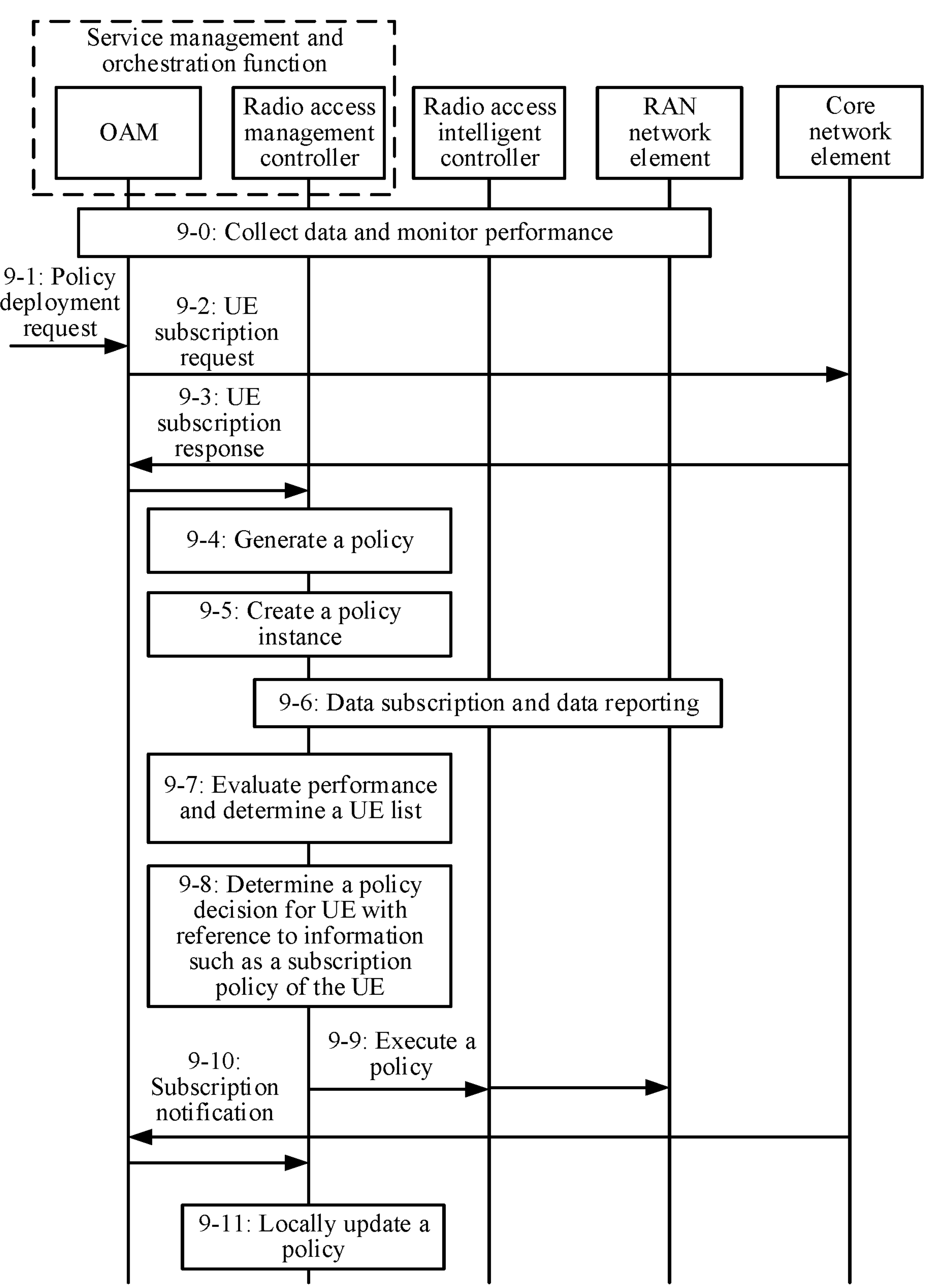
FIG. 9 is a schematic diagram of an implementation of policy conflict management.

FIG. 9 is a schematic diagram of an implementation of policy conflict management. As shown in FIG. 9, the implementation of policy conflict management is proactive preventive policy conflict processing. That is, a radio access management controller directly obtains related UE policy information (including UE subscription or QoS information) from a core network by using a management plane procedure, and determines a final optimization measure for UE with reference to the obtained policy information and UE policy information configured by the radio access management controller, to avoid a policy conflict. A specific implementation process is similar to that in FIG. 7. That is, a function implemented by a radio access intelligent controller is implemented by the radio access management controller, and details are not described herein again.

It can be learned that in this embodiment of this application, the OAM is responsible for providing a UE policy configured by the core network. The radio access intelligent controller is responsible for an information forwarding function. The radio access management controller is responsible for configuring a UE policy and detecting a policy conflict.

In other words, the radio access management controller obtains the UE policy information based on a management plane interface service, and detects a policy conflict in an optimization policy decision phase, to avoid generation of a UE policy with a policy conflict. In particular, the radio access management controller may add a new parameter feature through the management plane interface to support policy conflict detection, to avoid unnecessary signaling message exchange generated when a policy conflict is optimized.

Figure 10:
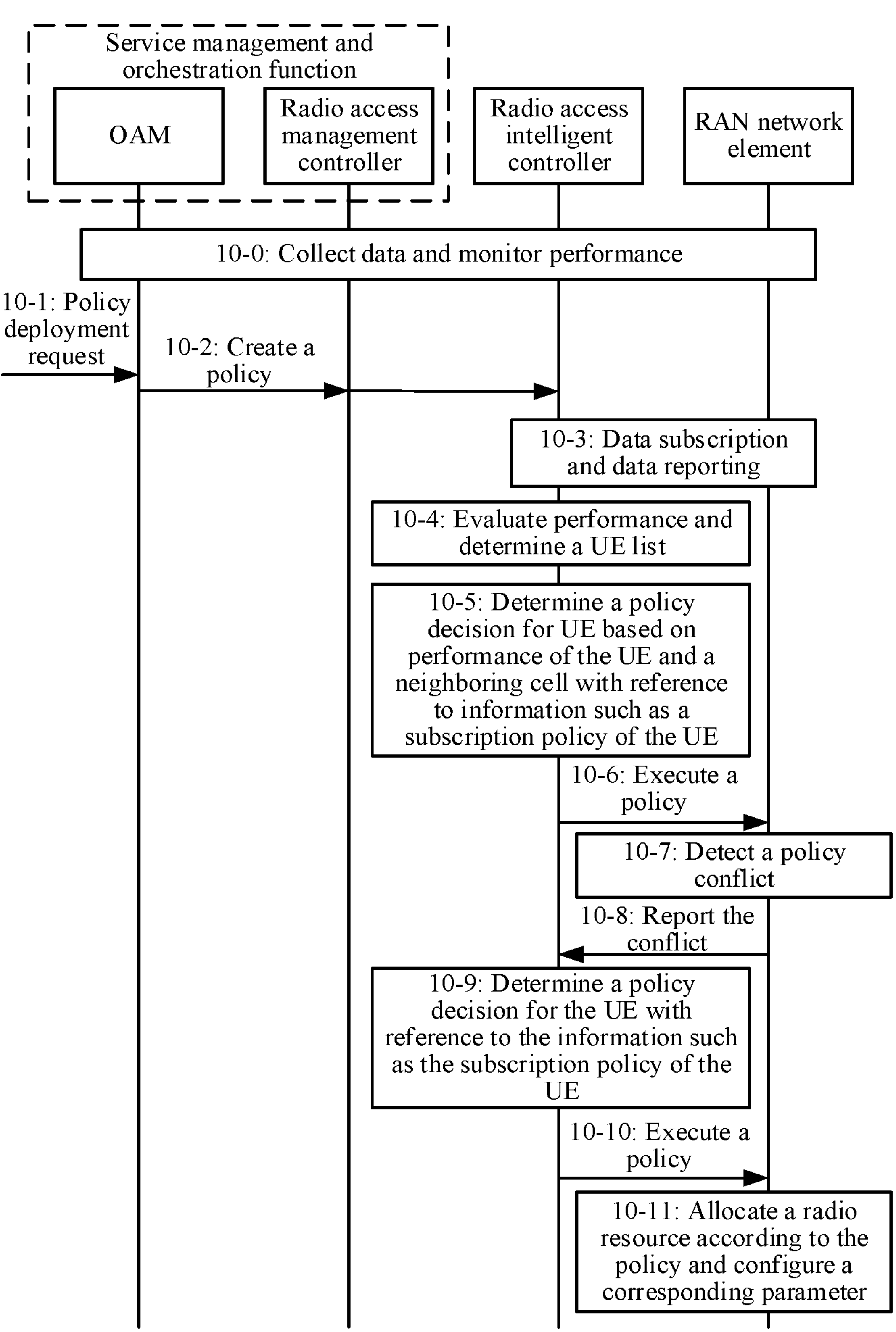
FIG. 10 is a schematic diagram of an implementation of policy conflict management.

FIG. 10 is a schematic diagram of an implementation of policy conflict management. As shown in FIG. 10, the implementation of policy conflict management is policy conflict feedback processing. That is, a radio access intelligent controller does not obtain UE policy information of a core network in advance, but obtains the UE policy information when a policy conflict occurs, and then makes an optimization policy decision again. That is, a RAN network element (for example, the CU-CP in FIG. 3, the CU in FIG. 4, or the gNB in FIG. 5) detects a policy conflict and reports the policy conflict and the UE policy information. The radio access intelligent controller makes an optimization policy decision again with reference to the UE policy information, to resolve a policy conflict.

The specific implementation process includes the following steps.

Step 10-0: OAM may collect performance data from a RAN network element (for example, the CU-CP, the CU-UP, and the DU in FIG. 3, the CU and the DU in FIG. 4, or the gNB in FIG. 5) based on a management plane performance management procedure. The RAN network element that can provide the performance data may be the CU-CP, the CU-UP, and the DU in FIG. 3, or may be the CU and the DU in FIG. 4, or may be the gNB in FIG. 5.

Step 10-1: The OAM receives an externally input management request, that is, a policy deployment request. The policy deployment request may include information such as a policy type, a policy target, and a policy application object (Scope).

The policy target may be a QoE (quality of experience) target. The policy application object (Scope) may be one of a UE identifier list (UE id list), a UE group identifier (UE group ID), and the like. For example, the UE group identifier may be an attribute feature identifier of a UE group such as a QCI (quality of service class identifier), a slice identifier (slice ID), and a location area.

For example, the Policy policy may be: a service offload policy, a service for a specific type, and when QoE of a current serving cell cannot meet a QoE target of the UE, the UE is handed over to a target cell that meets QoE of the service. The service offload policy is a policy type, the service for a specific type is a policy application object (Scope), and the QoE target is a policy target.

Step 10-2: After receiving the policy deployment request, the OAM instructs, through an internal interface, the radio access management controller to create a policy instance. The radio access management controller performs modeling on the policy in step 10-1 according to a policy model of a P1 interface, and sends a policy instance creation request message to the radio access intelligent controller through the P1 interface. The message includes the information such as the policy type, the policy application object (Scope), and the policy target (QoE Target) in step 6-1.

It should be noted that the OAM and the radio access management controller are logically two different functional modules, and may also be separately used as independent network elements. For example, the radio access management controller is integrated in a service management and orchestration function. The OAM is a general name of a management network element, and may be specifically implemented by management network elements such as an ONAP (open networking automation platform) and an NMS (network management system). The policy conflict management solution provided in this application is also applicable to a deployment scenario in which the radio access management controller and the OAM are independent of each other.

Step 10-3: The radio access intelligent controller receives the policy information sent by the radio access management controller, and determines, based on a policy decision requirement, data that needs to be collected from the RAN, that is, sends a data subscription request message to the RAN network element (for example, the CU-CP, the CU-UP, and the DU in FIG. 3, or the CU and the DU in FIG. 4, or the gNB in FIG. 5) through an R2 or R3 or R4 interface. The request message may include information such as a request data type (DataType), and the request data type may include UE performance data, cell performance data, and UE signal measurement data. The UE signal measurement data may include measured signal quality, for example, RSRP (signal received power) and RSRQ (reference signal received quality).

It should be noted that in this application, a network architecture of the RAN may be shown in FIG. 3, FIG. 4, or FIG. 5. Correspondingly, the RAN network element configured to request data subscription may be the CU-CP, the CU-UP, and the DU in FIG. 3, or may be the CU and the DU in FIG. 4, or may be the gNB in FIG. 5.

After collecting subscription data, the RAN network element (for example, the CU-CP, the CU-UP, and the DU in FIG. 3, the CU and the DU in FIG. 4, or the gNB in FIG. 5) reports the UE performance data, the cell performance data, and the UE signal measurement data to the radio access intelligent controller by using a data report message of the R2, R3, or R4 interface.

Step 10-4: The radio access intelligent controller calculates current QoE of the UE based on the UE performance data, and analyzes whether the current QoE meets the policy target (QoE Target) in the policy delivered in step 10-2. If the current QoE does not meet the policy target (QoE Target), the radio access intelligent controller determines that optimization processing needs to be performed on the UE, and determines a UE list if QoE of a plurality of UEs does not meet the policy target (QoE Target).

Step 10-5: After determining the UE on which optimization processing needs to be performed or the UE list, the radio access intelligent controller further needs to determine a specific optimization processing policy decision (that is, a policy execution operation). For example, the radio access intelligent controller needs to evaluate performance of a neighboring cell of a current cell serving the UE, to find a target cell that meets the policy target (QoE Target).

Step 10-6: The radio access intelligent controller sends a policy execution operation instruction message to the RAN network element (for example, the CU-CP in FIG. 3, the CU in FIG. 4, or the gNB in FIG. 5) through the R2 interface. For example, the radio access intelligent controller in FIG. 3 sends the policy execution operation instruction message to the CU-CP through the R2 interface. The radio access intelligent controller in FIG. 4 sends the policy execution operation instruction message to the CU. The radio access intelligent controller in FIG. 5 sends the policy execution operation instruction message to the gNB.

Step 10-7: The RAN network element (for example, the CU-CP in FIG. 3, the CU in FIG. 4, or the gNB in FIG. 5) detects a policy conflict, determines whether a conflict occurs between the policy execution operation execution information delivered by the radio access intelligent controller and a UE policy delivered by the core network, and if a conflict occurs, determines specific information of the policy conflict, including a corresponding UE identifier (UE id) and UE policy information (the policy delivered by the core network). For example, after the CU-CP in FIG. 3 receives the policy execution operation instruction from the radio access intelligent controller, the CU-CP detects a policy conflict, and reports a policy conflict if the policy conflict is detected. After the CU in FIG. 4 receives the policy execution operation instruction from the radio access intelligent controller, the CU detects a policy conflict, and reports a policy conflict if the policy conflict is detected. After the gNB in FIG. 5 receives the policy execution operation instruction from the radio access intelligent controller, the gNB detects a policy conflict, and reports a policy conflict if the policy conflict is detected.

Step 10-8: The RAN network element (for example, the CU-CP in FIG. 3, the CU in FIG. 4, or the gNB in FIG. 5) reports a policy conflict to the radio access intelligent controller through R2, and includes a policy conflict indication, a UE identifier (UE ID), and UE subscription information in the reported message. The policy conflict indication indicates that a policy conflict occurs, and the radio access intelligent controller determines, based on the indication, that a policy decision (that is, the policy operation instruction) needs to be updated.

Step 10-9: The radio access intelligent controller makes an optimization policy decision again with reference to the policy information obtained in step 10-8, that is, re-determines another optimization policy decision that meets a policy target requirement.

Step 10-10: The radio access intelligent controller sends an updated policy execution operation instruction message to the RAN network element (for example, the CU-CP in FIG. 3, the CU in FIG. 4, or the gNB in FIG. 5) through the R2 interface. For example, the radio access intelligent controller in FIG. 3 sends the updated policy execution operation instruction message to the CU-CP through the R2 interface. The radio access intelligent controller in FIG. 4 sends the updated policy execution operation instruction message to the CU. The radio access intelligent controller in FIG. 5 sends the updated policy execution operation instruction message to the gNB.

Step 10-11: The RAN network element (for example, the CU-CP in FIG. 3, the CU in FIG. 4, or the gNB in FIG. 5) performs an optimization processing procedure for specified UE according to the policy execution operation instruction in step 10-10, for example, reallocates a radio resource to the UE, and configures a corresponding parameter. For example, after the CU-CP in FIG. 3 receives the policy execution operation instruction from the radio access intelligent controller, the CU-CP performs a handover processing procedure for the UE corresponding to the UE identifier. After the CU in FIG. 4 receives the policy execution operation instruction from the radio access intelligent controller, the CU executes a handover processing procedure for the UE corresponding to the UE identifier. After the gNB in FIG. 5 receives the policy execution operation instruction from the radio access intelligent controller, the gNB performs a handover processing procedure for the UE corresponding to the UE identifier.

It can be learned that in this embodiment of this application, the radio access management controller is responsible for configuring a UE policy. The radio access intelligent controller is responsible for making a policy decision. The RAN network element (for example, the CU-CP in FIG. 3, the CU in FIG. 4, or the gNB in FIG. 5) is responsible for detecting a policy conflict.

In other words, the radio access intelligent controller directionally obtains, based on a conflict detection result of the RAN network element (for example, the CU-CP in FIG. 3, the CU in FIG. 4, or the gNB in FIG. 5), corresponding UE policy information on which a policy conflict occurs, and makes a policy decision in an optimization policy decision phase based on the UE policy information on which a policy conflict occurs, to avoid generation of a UE policy with a policy conflict. In particular, the RAN network element (for example, the CU-CP in FIG. 3, the CU in FIG. 4, or the gNB in FIG. 5) is enhanced to support policy conflict detection, and the radio access intelligent controller is supported in directionally obtaining the corresponding UE policy information on which a policy conflict occurs, to obtain less unnecessary UE information, and reduce consumption of interface resources for data obtaining.

Figure 11:
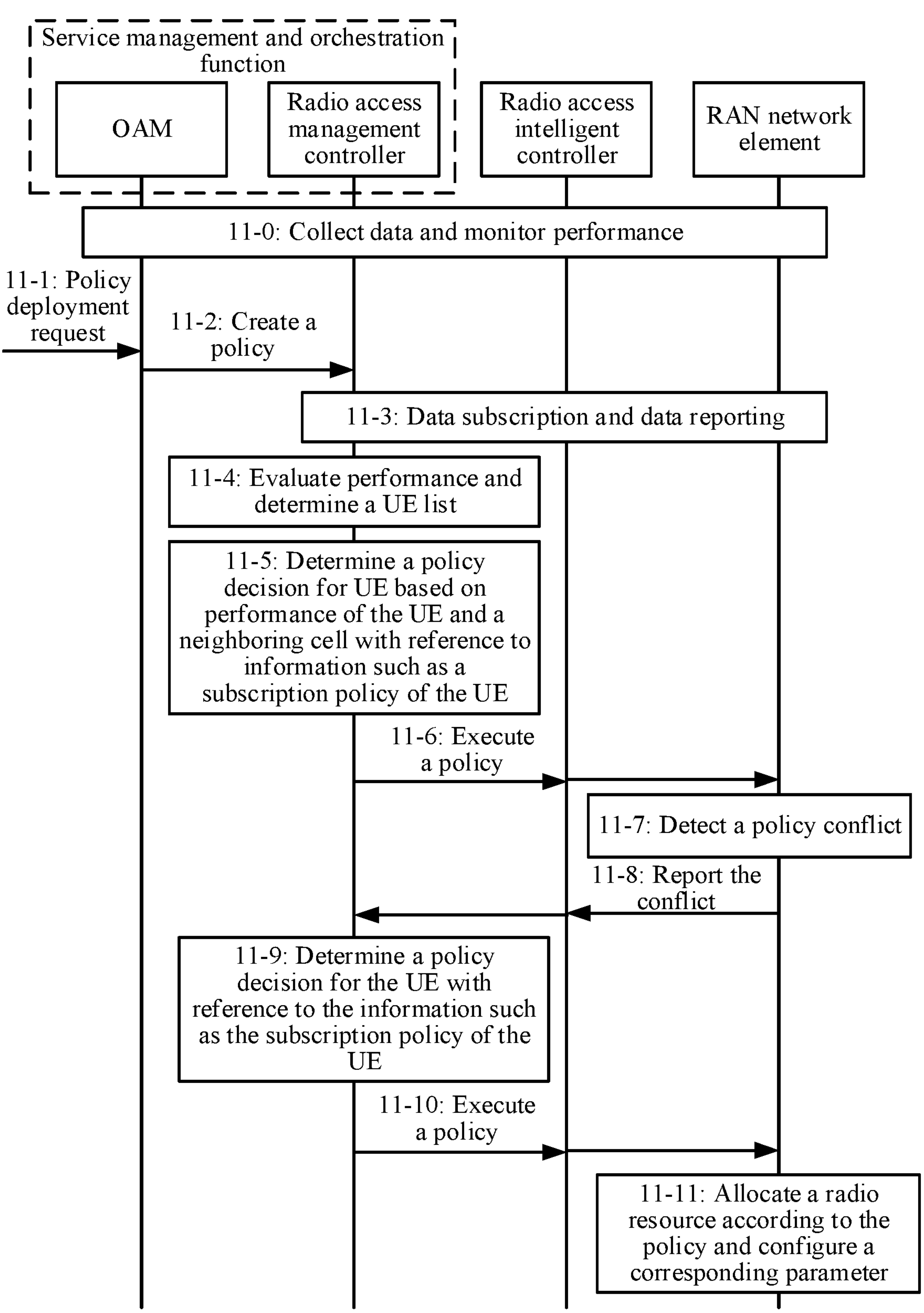
FIG. 11 is a schematic diagram of an implementation of policy conflict management.

FIG. 11 is a schematic diagram of an implementation of policy conflict management. As shown in FIG. 11, the implementation of policy conflict management is policy conflict feedback processing. That is, a radio access management controller does not obtain UE policy information of a core network in advance, but obtains the UE policy information when a policy conflict occurs, and then makes an optimization policy decision again. That is, a RAN network element (for example, the CU-CP in FIG. 3, the CU in FIG. 4, or the gNB in FIG. 5) detects a policy conflict and reports the policy conflict and the UE policy information. The radio access management controller makes an optimization policy decision again with reference to the UE policy information, to resolve a policy conflict.

A specific implementation process is similar to that in FIG. 10. That is, a function implemented by a radio access intelligent controller is implemented by the radio access management controller, and details are not described herein again.

It can be learned that in this embodiment of this application, the radio access management controller is responsible for configuring a UE policy and making a policy decision. The radio access intelligent controller is responsible for an information forwarding function. The RAN network element (for example, the CU-CP in FIG. 3, the CU in FIG. 4, or the gNB in FIG. 5) is responsible for detecting a policy conflict.

In other words, the radio access management controller directionally obtains, based on a policy conflict detection result of the RAN network element (for example, the CU-CP in FIG. 3, the CU in FIG. 4, or the gNB in FIG. 5), corresponding UE policy information on which a policy conflict occurs, and makes a policy decision in an optimization policy decision phase based on the UE policy information on which a policy conflict occurs, to avoid generation of a UE policy with a policy conflict. In particular, the RAN network element (for example, the CU-CP in FIG. 3, the CU in FIG. 4, or the gNB in FIG. 5) is enhanced to support policy conflict detection, and the radio access management controller is supported in directionally obtaining the corresponding UE policy information on which a policy conflict occurs, to obtain less unnecessary UE information, and reduce consumption of interface resources for data obtaining.

Next, FIG. 12 is a schematic flowchart of a policy conflict management method according to an embodiment of this application. The method may be applied to a first controller, and the first controller may be the radio access intelligent controller or the radio access management controller in any scenario in FIG. 3 to FIG. 5. As shown in FIG. 12, the method may include the following steps.

S1201: Receive first policy information, where the first policy information includes a first policy configured by a core network for UE.

In an embodiment, the first controller may receive the first policy information through a RAN network element. For example, the first controller sends a first subscription request message for subscription information of the UE to the RAN network element, and receives a first subscription response message from the RAN network element. The first subscription response message includes the first policy information. The RAN network element herein may be the CU-CP in FIG. 3, the CU in FIG. 4, or the gNB in FIG. 5.

In an embodiment, the first controller may alternatively receive the first policy information through a second controller. For example, the first controller receives a second policy instance creation message from the second controller. The second policy instance creation message includes the first policy information and a second policy, and the first policy information is information received by the second controller from the core network through an OAM entity.

It should be noted that when the first controller may be the radio access intelligent controller in any scenario in FIG. 3 to FIG. 5, the second controller may be the radio access management controller in any scenario in FIG. 3 to FIG. 5. When the first controller may be the radio access management controller in any scenario in FIG. 3 to FIG. 5, the second controller may also be the radio access management controller in any scenario in FIG. 3 to FIG. 5.

In an embodiment, when both the first controller and the second controller are the radio access management controllers in any one of the scenarios in FIG. 3 to FIG. 5, the radio access management controller may receive the first policy information through the OAM entity. For example, the first controller sends a second subscription request message for the subscription information of the UE to the core network through the OAM entity, and receives a second subscription response message from the core network through the OAM entity. The second subscription response message includes the first policy information.

In an embodiment, when both the first controller and the second controller are the radio access management controllers in any one of the scenarios in FIG. 3 to FIG. 5, the radio access management controller may alternatively receive the first policy information through the RAN network element. For example, the first controller sends a third subscription request message for the subscription information of the UE to the RAN network element through the radio intelligent management controller, and receives a third subscription response message from the RAN network element through the radio intelligent management controller. The third subscription response message includes the first policy information. The RAN network element herein may be the CU-CP in FIG. 3, the CU in FIG. 4, or the gNB in FIG. 5.

S1202: Detect that a policy conflict occurs between the first policy information and second policy information, where the second policy information includes the second policy configured by the second controller for the UE, or a first decision result obtained after the first controller makes a policy decision according to the second policy.

In an embodiment, when the first controller may be the radio access intelligent controller in any scenario in FIG. 3 to FIG. 5, and the second controller may be the radio access management controller in any scenario in FIG. 3 to FIG. 5, the first controller may receive a policy instance creation message from the second controller. The policy instance creation message includes the first policy information and the second policy. The first policy information is information received by the second controller from the core network through the OAM entity.

S1203: Make a policy decision according to the first policy and the second policy, to obtain a second decision result.

S1204: Send the second decision result to the RAN network element, so that the RAN network element executes the second decision result. The RAN network element herein may be the CU-CP in FIG. 3, the CU in FIG. 4, or the gNB in FIG. 5.

Specifically, for a specific implementation process of this step, refer to step 6-8 and step 6-9 in FIG. 6, or step 7-9 in FIG. 7, or step 8-8 and step 8-9 in FIG. 8, or step 9-9 in FIG. 9. Details are not described herein again.

It can be learned that the radio access intelligent controller or the radio access management controller may be responsible for detecting a policy conflict, and when detecting a policy conflict, may make a policy decision according to the first policy configured by the core network for the UE and the second policy configured by the second controller for the UE, to avoid generation of a UE policy with a policy conflict.

Figure 13:
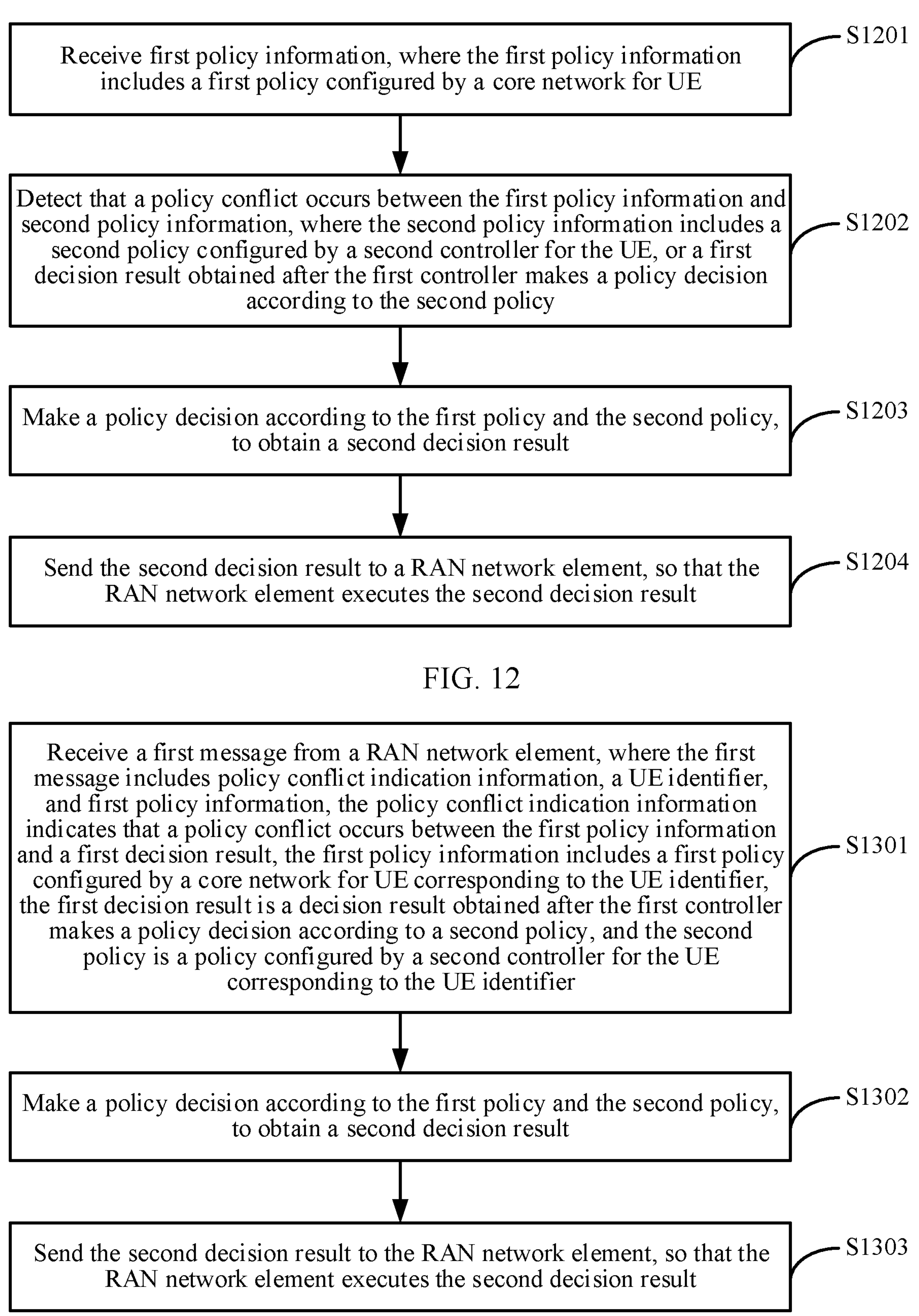
FIG. 13 is a schematic flowchart of a policy conflict management method according to an embodiment of this application.

FIG. 13 is a schematic flowchart of a policy conflict management method according to an embodiment of this application. The method may be applied to a first controller, and the first controller may be the radio access intelligent controller or the radio access management controller in any scenario in FIG. 3 to FIG. 5. As shown in FIG. 13, the method may include the following steps.

S1301: Receive a first message from a RAN network element, where the first message includes policy conflict indication information, a UE identifier, and first policy information, the policy conflict indication information indicates that a policy conflict occurs between the first policy information and a first decision result, the first policy information includes a first policy configured by a core network for UE corresponding to the UE identifier, the first decision result is a decision result obtained after the first controller makes a policy decision according to a second policy, and the second policy is a policy configured by a second controller for the UE corresponding to the UE identifier. The RAN network element herein may be the CU-CP in FIG. 3, the CU in FIG. 4, or the gNB in FIG. 5.

In an embodiment, the first controller may further receive a policy instance creation message from the second controller. The policy instance creation message includes the second policy.

It should be noted that when the first controller may be the radio access intelligent controller in any scenario in FIG. 3 to FIG. 5, the second controller may be the radio access management controller in any scenario in FIG. 3 to FIG. 5. When the first controller may be the radio access management controller in any scenario in FIG. 3 to FIG. 5, the second controller may also be the radio access management controller in any scenario in FIG. 3 to FIG. 5.

S1302: Make a policy decision according to the first policy and the second policy, to obtain a second decision result.

Specifically, for a specific implementation process of this step, refer to step 10-10 and step 10-11 in FIG. 10, or step 11-10 and step 11-11 in FIG. 11. Details are not described herein again.

S1303: Send the second decision result to the RAN network element, so that the RAN network element executes the second decision result. The RAN network element herein may be the CU-CP in FIG. 3, the CU in FIG. 4, or the gNB in FIG. 5.

Specifically, for a specific implementation process of this step, refer to step 10-9 in FIG. 10, or step 11-9 in FIG. 11. Details are not described herein again.

It can be learned that in this embodiment of this application, the RAN network element (for example, the CU-CP in FIG. 3, the CU in FIG. 4, or the gNB in FIG. 5) may be responsible for detecting a policy conflict. The radio access intelligent controller or the radio access management controller is responsible for making a policy decision based on the UE policy information that is reported by the RAN network element and on which the policy conflict occurs, to avoid generation of a UE policy with a policy conflict. In particular, the RAN network element (for example, the CU-CP in FIG. 3, the CU in FIG. 4, or the gNB in FIG. 5) is enhanced to support policy conflict detection, and the radio access intelligent controller or the radio access management controller is supported in directionally obtaining the corresponding UE policy information on which a policy conflict occurs, to obtain less unnecessary UE information, and reduce consumption of interface resources for data obtaining.

Figure 14:
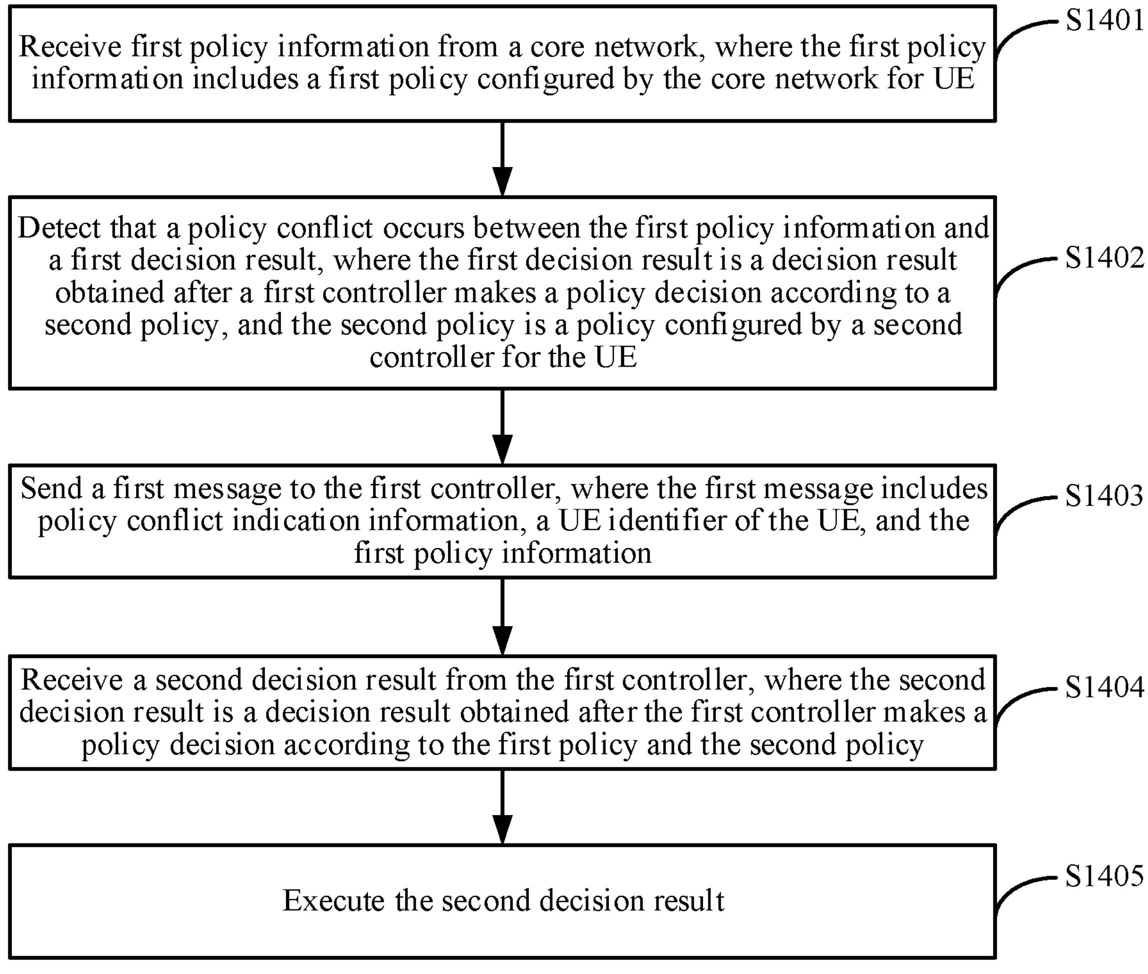
FIG. 14 is a schematic flowchart of a policy conflict management method according to an embodiment of this application.

FIG. 14 is a schematic flowchart of a policy conflict management method according to an embodiment of this application. The method may be applied to a RAN network element, and the RAN network element may be the CU-CP in FIG. 3, the CU in FIG. 4, or the gNB in FIG. 5. As shown in FIG. 14, the method may include the following steps.

S1401: Receive first policy information from a core network, where the first policy information includes a first policy configured by the core network for UE.

Specifically, the RAN network element (for example, the CU-CP in FIG. 3, the CU in FIG. 4, or the gNB in FIG. 5) may receive the first policy information through an interface between the RAN network element and the core network.

It should be noted that a core network element configured to provide the first policy information may be at least one of the NEF, the NWDAF, the UDM, the AMF, and the SMF in the core network shown in FIG. 3. In other words, in addition to the NEF and the NWDAF, the radio access management controller may further obtain the related UE policy information from the AMF, the SMF, or the UDM based on a management plane interface service. This is not limited in this application.

S1402: Detect that a policy conflict occurs between the first policy information and a first decision result, where the first decision result is a decision result obtained after a first controller makes a policy decision according to a second policy, and the second policy is a policy configured by a second controller for the UE.

Specifically, for a specific implementation process of this step, refer to step 10-7 in FIG. 10, or step 11-7 in FIG. 11. Details are not described herein again.

It should be noted that when the first controller may be the radio access intelligent controller in any scenario in FIG. 3 to FIG. 5, the second controller may be the radio access management controller in any scenario in FIG. 3 to FIG. 5. When the first controller may be the radio access management controller in any scenario in FIG. 3 to FIG. 5, the second controller may also be the radio access management controller in any scenario in FIG. 3 to FIG. 5.

S1403: Send a first message to the first controller, where the first message includes policy conflict indication information, a UE identifier of the UE, and the first policy information. The policy conflict indication information indicates that a policy conflict occurs between the first policy information and the first decision result.

Specifically, for a specific implementation process of this step, refer to step 10-8 in FIG. 10, or step 11-8 in FIG. 11. Details are not described herein again.

S1404: Receive a second decision result from the first controller, where the second decision result is a decision result obtained after the first controller makes a policy decision according to the first policy and the second policy.

It should be noted that for a specific implementation process of this step, refer to step 10-10 in FIG. 10, or step 11-10 in FIG. 11. Details are not described herein again.

S1405: Execute the second decision result.

It should be noted that for a specific implementation process of this step, refer to step 10-11 in FIG. 10, or step 11-11 in FIG. 11. Details are not described herein again.

It can be learned that in this embodiment of this application, the RAN network element (for example, the CU-CP in FIG. 3, the CU in FIG. 4, or the gNB in FIG. 5) may be responsible for detecting a policy conflict, and if a policy conflict is detected, may report the policy conflict to the radio access intelligent controller or the radio access management controller that is responsible for making a policy decision. In this way, the radio access intelligent controller or the radio access management controller that is responsible for making a policy decision may make a policy decision based on UE policy information on which a policy conflict occurs, to avoid generation of a UE policy with a policy conflict. In particular, the RAN network element (for example, the CU-CP in FIG. 3, the CU in FIG. 4, or the gNB in FIG. 5) is enhanced to support policy conflict detection, and the radio access intelligent controller or the radio access management controller is supported in directionally obtaining the corresponding UE policy information on which a policy conflict occurs, to obtain less unnecessary UE information, and reduce consumption of interface resources for data obtaining.

Figure 15:
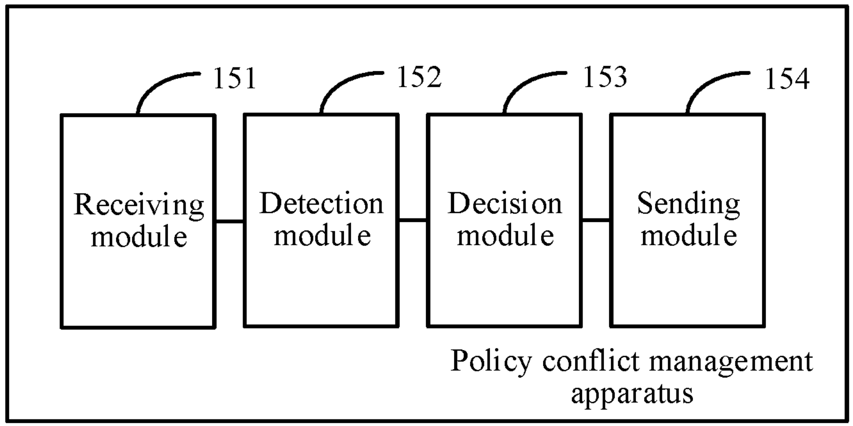
FIG. 15 is a schematic diagram of a structure of a policy conflict management apparatus according to an embodiment of this application.

FIG. 15 is a schematic diagram of a structure of a policy conflict management apparatus according to an embodiment of this application. The apparatus may be used in a first controller, and the first controller may be the radio access intelligent controller or the radio access management controller in any scenario in FIG. 3 to FIG. 5. As shown in FIG. 15, the policy conflict management apparatus may include:

a receiving module 151, configured to receive first policy information, where the first policy information includes a first policy configured by a core network for UE;

a detection module 152, configured to detect that a policy conflict occurs between the first policy information and second policy information, where the second policy information includes a second policy configured by a second controller for the UE, or a first decision result obtained after the first controller makes a policy decision according to the second policy;

a decision module 153, configured to make a policy decision according to the first policy and the second policy, to obtain a second decision result; and a sending module 154, configured to send the second decision result to a radio access network RAN network element, so that the RAN network element executes the second decision result.

In an embodiment, the receiving module 151 may include:

a first receiving submodule, configured to receive the first policy information through the RAN network element.

In an embodiment, the first receiving submodule may include:

a first sending unit, configured to send a first subscription request message for subscription information of the UE to the RAN network element; and a first receiving unit, configured to receive a first subscription response message from the RAN network element, where the first subscription response message includes the first policy information.

In an embodiment, the apparatus further includes:

a creation message receiving module, configured to receive a first policy instance creation message from the second controller, where the first policy instance creation message includes the second policy.

In an embodiment, the receiving module 151 may include:

a second receiving submodule, configured to receive the first policy information through the second controller.

In an embodiment, the second receiving submodule may include:

a second receiving unit, configured to receive a second policy instance creation message from the second controller, where the second policy instance creation message includes the first policy information and the second policy, and the first policy information is information received by the second controller from the core network through an operation, administration, and maintenance OAM entity.

In an embodiment, the first controller is a radio access intelligent controller, and the second controller is a radio access management controller.

In an embodiment, both the first controller and the second controller are radio access management controllers.

In an embodiment, the receiving module 151 may include:

a third receiving submodule, configured to receive the first policy information through an OAM entity.

In an embodiment, the third receiving submodule may include:

a second sending unit, configured to send a second subscription request message for the subscription information of the UE to the core network through the OAM entity; and a third receiving unit, configured to receive a second subscription response message from the core network through the OAM entity, where the second subscription response message includes the first policy information.

In an embodiment, the receiving module 151 may include:

a fourth receiving submodule, configured to receive the first policy information through the RAN network element.

In an embodiment, the fourth receiving submodule may include:

a third sending unit, configured to send a third subscription request message for the subscription information of the UE to the RAN network element through a radio intelligent management controller; and a fourth receiving unit, configured to receive a third subscription response message from the RAN network element through the radio intelligent management controller, where the third subscription response message includes the first policy information.

It should be understood that the apparatus is configured to perform the policy conflict management method in any embodiment in FIG. 6 to FIG. 9. An implementation principle and a technical effect of a corresponding program module in the apparatus are similar to those described in the policy conflict management method in any embodiment in FIG. 6 to FIG. 9. For a working process of the apparatus, refer to a corresponding process in the policy conflict management method in any embodiment in FIG. 6 to FIG. 9. Details are not described herein again.

Figure 16:
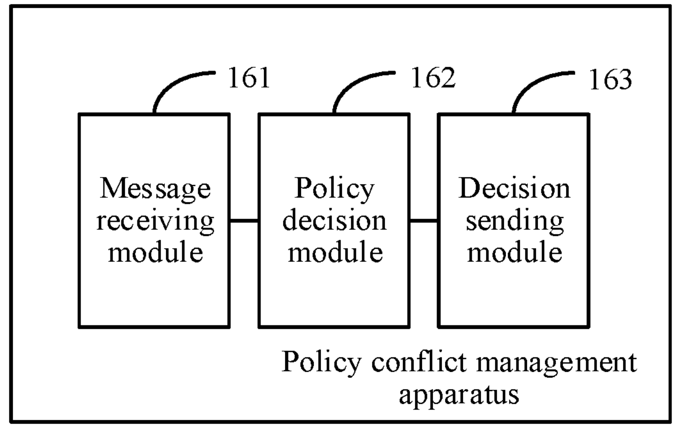
FIG. 16 is a schematic diagram of a structure of a policy conflict management apparatus according to an embodiment of this application.

FIG. 16 is a schematic diagram of a structure of a policy conflict management apparatus according to an embodiment of this application. The apparatus may be used in a first controller, and the first controller may be the radio access intelligent controller or the radio access management controller in any scenario in FIG. 3 to FIG. 5. As shown in FIG. 16, the policy conflict management apparatus may include:

a message receiving module 161, configured to receive a first message from a radio access network RAN network element, where the first message includes policy conflict indication information, a UE identifier, and first policy information, the policy conflict indication information indicates that a policy conflict occurs between the first policy information and a first decision result, the first policy information includes a first policy configured by a core network for UE corresponding to the UE identifier, the first decision result is a decision result obtained after the first controller makes a policy decision according to a second policy, and the second policy is a policy configured by a second controller for the UE corresponding to the UE identifier;

a policy decision module 162, configured to make a policy decision according to the first policy and the second policy, to obtain a second decision result; and a policy sending module 163, configured to send the second decision result to the RAN network element, so that the RAN network element executes the second decision result.

In an embodiment, the apparatus further includes:

a policy instance creation message receiving module, configured to receive a policy instance creation message from the second controller, where the policy instance creation message includes the second policy.

In an embodiment, the first controller is a radio access intelligent controller, and the second controller is a radio access management controller.

In an embodiment, both the first controller and the second controller are radio access management controllers.

It should be understood that the apparatus is configured to perform the policy conflict management method in any embodiment in FIG. 10 and FIG. 11. An implementation principle and a technical effect of a corresponding program module in the apparatus are similar to those described in the policy conflict management method in any embodiment in FIG. 10 and FIG. 11. For a working process of the apparatus, refer to a corresponding process in the policy conflict management method in any embodiment in FIG. 10 and FIG. 11. Details are not described herein again.

Figure 17:
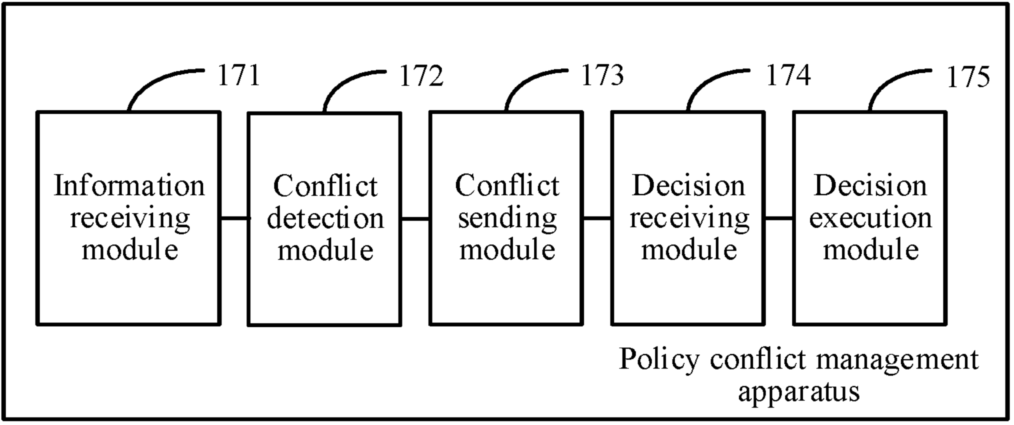
FIG. 17 is a schematic diagram of a structure of a policy conflict management apparatus according to an embodiment of this application.

FIG. 17 is a schematic diagram of a structure of a policy conflict management apparatus according to an embodiment of this application. The apparatus may be used in a RAN network element, and the RAN network element may be the CU-CP in FIG. 3, the CU in FIG. 4, or the gNB in FIG. 5. As shown in FIG. 17, the policy conflict management apparatus may include:

an information receiving module 171, configured to receive first policy information from a core network, where the first policy information includes a first policy configured by the core network for UE;

a conflict detection module 172, configured to detect that a policy conflict occurs between the first policy information and a first decision result, where the first decision result is a decision result obtained after a first controller makes a policy decision according to a second policy, and the second policy is a policy configured by a second controller for the UE;

a conflict sending module 173, configured to send a first message to the first controller, where the first message includes policy conflict indication information, a UE identifier of the UE, and the first policy information, and the policy conflict indication information indicates that a policy conflict occurs between the first policy information and the first decision result;

a decision receiving module 174, configured to receive a second decision result from the first controller, where the second decision result is a decision result obtained after the first controller makes a policy decision according to the first policy and the second policy; and a decision execution module 175, configured to execute the second decision result.

In an embodiment, the first controller is a radio access intelligent controller, and the second controller is a radio access management controller.

In an embodiment, both the first controller and the second controller are radio access management controllers.

In an embodiment, the apparatus further includes:

a decision result receiving module, configured to receive the first decision result from the radio access management controller through a radio access intelligent controller.

It should be understood that the apparatus is configured to perform the policy conflict management method in any embodiment in FIG. 10 and FIG. 11. An implementation principle and a technical effect of a corresponding program module in the apparatus are similar to those described in the policy conflict management method in any embodiment in FIG. 10 and FIG. 11. For a working process of the apparatus, refer to a corresponding process in the policy conflict management method in any embodiment in FIG. 10 and FIG. 11. Details are not described herein again.

Figure 18:
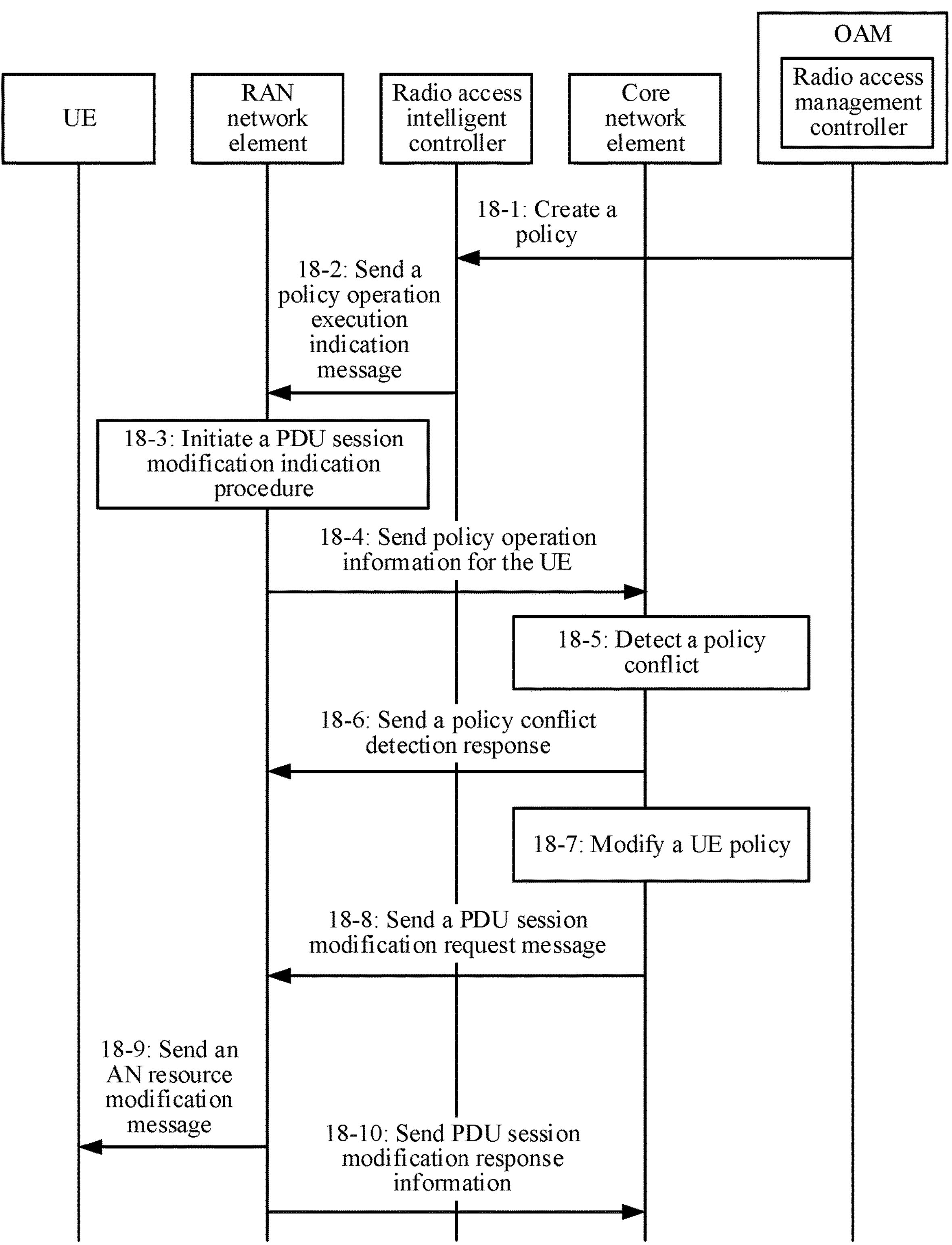
FIG. 18 is a schematic diagram of an implementation of policy conflict management.

FIG. 18 is a schematic diagram of an implementation of policy conflict management. As shown in FIG. 18, the implementation of policy conflict management is based on a service processing procedure of the 3GPP (the 3rd Generation Partnership Project, the 3rd generation partnership project) standard specification, that is, a PDU (protocol data unit) session resource modification indication procedure described in FIG. 18. This procedure is enhanced to support a RAN in sending, to a core network, a policy (for example, QoS in FIG. 18) that needs to be modified, to implement policy negotiation between the RAN and the core network. In this way, a policy conflict is resolved.

The specific implementation process includes the following steps.

Step 18-1: Create a policy.

Specifically, OAM collects performance data from a RAN network element (for example, the CU-CP, the CU-UP, and the DU in FIG. 3, the CU and the DU in FIG. 4, or the gNB in FIG. 5) based on a management plane performance management procedure, and instructs, based on an externally input management request (that is, a policy deployment request) through an internal interface, a radio access management controller to create a policy instance. The policy deployment request may include information such as a policy type, a policy target, and a policy application object (Scope). The policy target may be a QoE (quality of experience) target. The policy application object (Scope) may be one of a UE identifier list (UE ID list), a UE group identifier (UE group ID), and the like. For example, the UE group identifier may be an attribute feature identifier of a UE group such as a QCI (quality of service class identifier), a slice identifier (slice ID), and a location area.

The radio access management controller determines a policy execution operation (for example, QoS modification) on UE based on the policy deployment request and performance data of the UE, performs modeling on information such as the policy execution operation according to an information model of a P1 interface, and sends a policy instance creation request message to a radio access intelligent controller through the P1 interface. For example, if the policy execution operation on the UE is QoS modification, the request message may include information such as a UE identifier (UE ID), a service identifier (QoSId) for which QoS needs to be modified, and QoS that needs to be modified.

It can be learned that in this embodiment of this application, the radio access management controller may be responsible for configuring the UE policy, and delivering the configured UE policy to the radio access intelligent controller through the P1 interface.

In addition, the radio access intelligent controller may also be responsible for configuring the UE policy. That is, the radio access intelligent controller determines the policy execution operation (for example, QoS modification) for the UE based on the policy deployment request and the performance data of the UE. The policy deployment request and the performance data of the UE may be obtained by using the radio access management controller.

Step 18-2: The radio access intelligent controller sends a policy operation execution indication message to the RAN network element (that is, a CU).

Specifically, after receiving the request message from the radio access management controller, the radio access intelligent controller sends the policy operation execution indication message to the RAN network element (that is, the CU) through an R2 interface. The message includes the UE identifier and policy operation information (for example, QoS) for the UE.

Step 18-3: The RAN network element initiates a PDU session modification indication procedure.

Specifically, after receiving the policy operation execution indication message sent by the radio access intelligent controller, the RAN network element (for example, the CU) needs to send the received policy operation information (for example, QoS) for the UE to the core network.

Step 18-4: The RAN network element sends the policy operation information for the UE to the core network.

Specifically, the RAN network element (for example, the CU) sends the received policy operation information (for example, QoS) for the UE to the core network element (for example, an AMF or an SMF) by using an N2 interface message procedure between the RAN network element and the core network.

The RAN network element may send the policy operation information for the UE by using the N2 interface message procedure, that is, a PDU session resource modification indication procedure, or may send a policy modification request message to the core network by adding the N2 interface message procedure. A specific implementation is not limited in this application.

Step 18-5: The core network detects a policy conflict.

Specifically, the core network element (for example, the AMF or the SMF) performs, based on locally stored UE subscription policy information or UE subscription policy information obtained from a UDM, conflict detection on the policy operation information for the UE received in step 18-4. If a conflict occurs, the core network element rejects the request of the RAN network element (for example, the CU); otherwise, receives the request of the RAN network element (for example, the CU).

Step 18-6: The core network element sends a policy conflict detection response to the RAN network element.

Specifically, after completing policy conflict detection, the core network element (for example, the AMF or the SMF) may respond to the request of the RAN network element, that is, a PDU session resource modification confirm message. The message carries policy conflict detection indication information. The policy conflict detection indication information indicates a policy conflict detection result of the core network element. If a policy conflict occurs, a value of the policy conflict detection indication information is failure, which means that a policy conflict occurs, and the policy modification request of the RAN network element (for example, the CU) is not received. Otherwise, a value of the policy conflict detection indication information is success, which means that a policy conflict does not occur, and the policy modification request of the RAN network element (for example, the CU) is received.

Optionally, if the policy conflict detection result is that there is no policy conflict, the method may further include steps 18-7 to 18-10.

Step 18-7: The core network modifies the UE policy.

Specifically, the core network element (for example, the AMF or the SMF) receives the policy request of the CU, and initiates UE policy (for example, QoS) modification.

Step 18-8: The core network element sends a PDU session modification request message to the RAN network element (for example, the CU).

Step 18-9: The RAN network element (for example, the CU) sends an AN (access network) resource modification message to the UE.

Step 18-10: The RAN network element (for example, the CU) sends PDU session modification response information to the core network element.

All steps 18-7 to 18-10 have been defined in the PDU session modification (PDU session modification) procedure in the 3GPP standard specification, and details are not described herein.

It can be learned that, in this embodiment of this application, the core network is responsible for detecting a policy conflict. An implementation process of the core network does not change a policy processing service procedure of the radio access management controller or the radio access management controller, and is consistent with a service processing mechanism specified in the 3GPP standard specification. In addition, in this embodiment of this application, the final sending of the UE policy modification is initiated by the core network. This can ensure that policy information of the UE, the RAN, and the core network is consistent (that is, policy synchronization).

The PDU session resource modification indication (that is, PDU session resource modify indication) procedure is enhanced to support the RAN in sending specific information about a modified policy to the core network, for example, a QoS parameter that needs to be modified, and the core network element is enhanced to perform UE policy conflict detection and final UE policy modification.

Figures 19, 20:
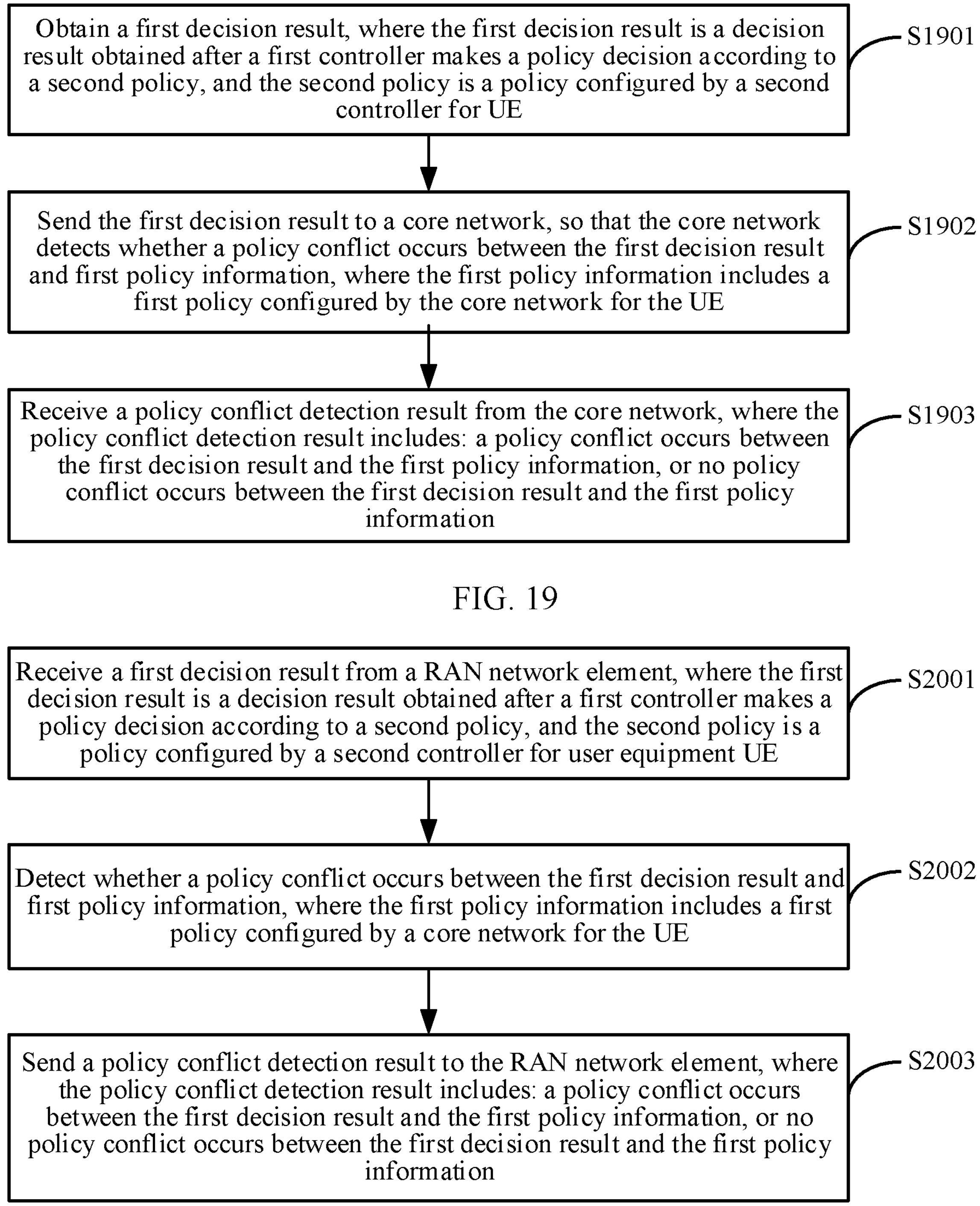
FIG. 19 is a schematic flowchart of a policy conflict management method according to an embodiment of this application.
FIG. 20 is a schematic flowchart of a policy conflict management method according to an embodiment of this application.

FIG. 19 is a schematic flowchart of a policy conflict management method according to an embodiment of this application. The method may be applied to a RAN network element, and the RAN network element may be the CU-CP in FIG. 3, the CU in FIG. 4, or the gNB in FIG. 5. As shown in FIG. 19, the method may include the following steps.

S1901: Obtain a first decision result, where the first decision result is a decision result obtained after a first controller makes a policy decision according to a second policy, and the second policy is a policy configured by a second controller for UE.

Specifically, for a specific implementation process of this step, refer to step 18-1 and step 18-2 in FIG. 18. Details are not described herein again. The first decision result may be policy operation information (for example, QoS) for the UE in FIG. 18.

The first controller and the second controller may be the same. For example, both the first controller and the second controller are radio access management controllers in any scenario in FIG. 3 to FIG. 5. Alternatively, the first controller may be different. For example, the first controller is the radio access intelligent controller in any scenario in FIG. 3 to FIG. 5, and the second controller is the radio access management controller in any scenario in FIG. 3 to FIG. 5.

S1902: Send the first decision result to a core network, so that the core network detects whether a policy conflict occurs between the first decision result and first policy information, where the first policy information includes a first policy configured by the core network for the UE.

Specifically, for a specific implementation process of this step, refer to step 18-3, step 18-4, step 18-5, and step 18-6 in FIG. 18. Details are not described herein again. The first policy may be UE subscription policy information that is locally stored or obtained by the core network element (for example, the AMF or the SMF) from the UDM in FIG. 18.

The first decision result may be sent to the core network by using an N2 interface message procedure, that is, a PDU session resource modification indication procedure. Specifically, the first decision result is added to a PDU session resource modification indication message, and the PDU session resource modification indication message is sent to the core network. In this way, the core network can obtain the first decision result from the PDU session resource modification indication message. Alternatively, the RAN network element may send a policy modification request message to the core network by adding an N2 interface message procedure. Specifically, the RAN network element adds the first decision result to the policy modification request message, and sends the policy modification request message to the core network. In this way, the core network can obtain the first decision result from the policy modification request message.

S1903: Receive a policy conflict detection result from the core network, where the policy conflict detection result includes: a policy conflict occurs between the first decision result and the first policy information, or no policy conflict occurs between the first decision result and the first policy information.

Specifically, the RAN network element learns, by using the policy conflict detection result, whether a policy conflict occurs between the first decision result and the first policy information.

When receiving the policy conflict detection result from the core network, the RAN network element may receive a PDU session resource modification confirm message from the core network. The PDU session resource modification confirm message includes the policy conflict detection result or indication information indicating the policy conflict detection result. The RAN network element determines the policy conflict detection result based on the PDU session resource modification confirm message. For example, a value of the indication information is failure (failure), which means that a policy conflict occurs, and the policy modification request of the RAN network element (for example, a CU) is not received. Otherwise, a value of the policy indication information is success (success), which means that a policy conflict does not occur, and the policy modification request of the RAN network element (for example, the CU) is received.

It can be learned that, in this embodiment of this application, the RAN network element (for example, the CU-CP in FIG. 3, the CU in FIG. 4, or the gNB in FIG. 5) is responsible for sending the first decision result on a controller side (for example, the first controller or the second controller) in an open radio access network to the core network. The core network is responsible for detecting a policy conflict, and returning a policy conflict detection result to the RAN network element. In this way, the RAN network element can learn, by using the policy conflict detection result, whether a policy conflict occurs between the first decision result and the first policy information. This avoids generation of a UE policy with a policy conflict, and ensures policy enforceability.

In addition, when the policy conflict detection result is that no policy conflict occurs between the first decision result and the first policy information, the RAN network element may further receive the PDU session modification request message from the core network, execute the first decision result based on the PDU session modification request message, and send a PDU session modification response message to the core network. For a specific implementation process, refer to steps 18-7 to 18-10 in FIG. 18. Details are not described herein again.

It can be learned that, in this embodiment of this application, the final sending of the UE policy modification is initiated by the core network. This can ensure that policy information of the UE, the RAN, and the core network is consistent (that is, policy synchronization).

FIG. 20 is a schematic flowchart of a policy conflict management method according to an embodiment of this application. The method may be applied to a core network. As shown in FIG. 20, the method may include the following steps.

S2001: Receive a first decision result from a RAN network element, where the first decision result is a decision result obtained after a first controller makes a policy decision according to a second policy, and the second policy is a policy configured by a second controller for user equipment UE.

S2002: Detect whether a policy conflict occurs between the first decision result and first policy information, where the first policy information includes a first policy configured by the core network for the UE.

Specifically, the first policy may be UE subscription policy information that is locally stored or obtained by the core network element (for example, the AMF or the SMF) from the UDM in FIG. 18.

S2003: Send a policy conflict detection result to the RAN network element, where the policy conflict detection result includes: a policy conflict occurs between the first decision result and the first policy information, or no policy conflict occurs between the first decision result and the first policy information.

For a specific implementation process of steps S2001 to S2003, refer to steps 18-1 to 18-6 in FIG. 18. Details are not described herein again. The first decision result may be policy operation information (for example, QoS) for the UE in FIG. 18.

The first controller and the second controller may be the same. For example, both the first controller and the second controller are radio access management controllers in any scenario in FIG. 3 to FIG. 5. Alternatively, the first controller may be different. For example, the first controller is the radio access intelligent controller in any scenario in FIG. 3 to FIG. 5, and the second controller is the radio access management controller in any scenario in FIG. 3 to FIG. 5.

When the first decision result is received from the RAN network element, a PDU session resource modification indication message or a policy modification request message may be received from the core network. The PDU session resource modification indication message or the policy modification request message includes the first decision result. The first decision result is obtained from the PDU session resource modification indication message or the policy modification request message.

When the policy conflict detection result is sent to the RAN network element, the policy conflict detection result or indication information indicating the policy conflict detection result may be added to a PDU session resource modification confirm message. The PDU session resource modification confirm message is sent to the RAN network element, so that the RAN network element can determine the policy conflict detection result based on the PDU session resource modification confirm message. For example, a value of the indication information is failure (failure), which means that a policy conflict occurs, and a policy modification request of the RAN network element (for example, a CU) is not received. Otherwise, a value of the policy indication information is success (success), which means that a policy conflict does not occur, and a policy modification request of the RAN network element (for example, the CU) is received.

It can be learned that, in this embodiment of this application, the RAN network element (for example, the CU-CP in FIG. 3, the CU in FIG. 4, or the gNB in FIG. 5) is responsible for sending the first decision result on a controller side (for example, the first controller or the second controller) in an open radio access network to the core network. The core network is responsible for detecting a policy conflict, and returning a policy conflict detection result to the RAN network element. In this way, the RAN network element can learn, by using the policy conflict detection result, whether a policy conflict occurs between the first decision result and the first policy information. This avoids generation of a UE policy with a policy conflict, and ensures policy enforceability.

In addition, after the core network sends the policy conflict detection result to the RAN network element, and when the policy conflict detection result is that no policy conflict occurs between the first decision result and the first policy information, the core network may further send a PDU session modification request message to the RAN network element. In this way, the RAN network element may execute the first decision result based on the PDU session modification request message.

It can be learned that, in this embodiment of this application, the final sending of the UE policy modification is initiated by the core network. This can ensure that policy information of the UE, the RAN, and the core network is consistent (that is, policy synchronization).

Figure 21:
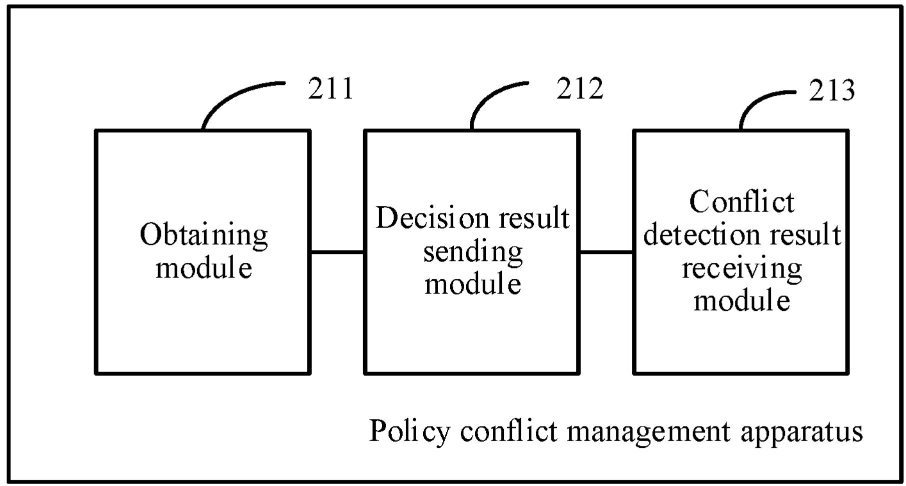
FIG. 21 is a schematic diagram of a structure of a policy conflict management apparatus according to an embodiment of this application.

FIG. 21 is a schematic diagram of a structure of a policy conflict management apparatus according to an embodiment of this application. The apparatus may be used in a RAN network element, and is configured to perform the policy conflict management method shown in FIG. 19. The RAN network element may be the CU-CP in FIG. 3, the CU in FIG. 4, or the gNB in FIG. 5. As shown in FIG. 21, the apparatus may include:

an obtaining module 211, configured to obtain a first decision result, where the first decision result is a decision result obtained after a first controller makes a policy decision according to a second policy, and the second policy is a policy configured by a second controller for user equipment UE;

a decision result sending module 212, configured to send the first decision result to a core network, so that the core network detects whether a policy conflict occurs between the first decision result and first policy information, where the first policy information includes a first policy configured by the core network for the UE; and a conflict detection result receiving module 213, configured to receive a policy conflict detection result from the core network, where the policy conflict detection result includes: a policy conflict occurs between the first decision result and the first policy information, or no policy conflict occurs between the first decision result and the first policy information.

In an embodiment, the first controller is a radio access intelligent controller, and the second controller is a radio access management controller; or both the first controller and the second controller are radio access management controllers.

In an embodiment, the decision result sending module 212 is specifically configured to: add the first decision result to a protocol data unit PDU session resource modification indication message or a policy modification request message, and send the PDU session resource modification indication message or the policy modification request message to a core network, so that the core network obtains the first decision result from the PDU session resource modification indication message or the policy modification request message.

In an embodiment, the conflict detection result receiving module 213 is specifically configured to: receive a PDU session resource modification confirm message from the core network, where the PDU session resource modification confirm message includes the policy conflict detection result or indication information indicating the policy conflict detection result; and determine the policy conflict detection result based on the PDU session resource modification confirm message.

In an embodiment, the policy conflict detection result is that no policy conflict occurs between the first decision result and the first policy information. The policy conflict management apparatus may include:

a PDU session modification request message receiving module, configured to receive a PDU session modification request message from the core network; and a decision result execution module, configured to: execute the first decision result based on the PDU session modification request message, and send a PDU session modification response message to the core network.

It should be understood that the apparatus is configured to perform the policy conflict management method in FIG. 18 or FIG. 19. An implementation principle and a technical effect of a corresponding program module in the apparatus are similar to those described in the policy conflict management method in FIG. 18 or FIG. 19. For a working process of the apparatus, refer to a corresponding process in the policy conflict management method in FIG. 18 or FIG. 19. Details are not described herein again.

Figure 22:
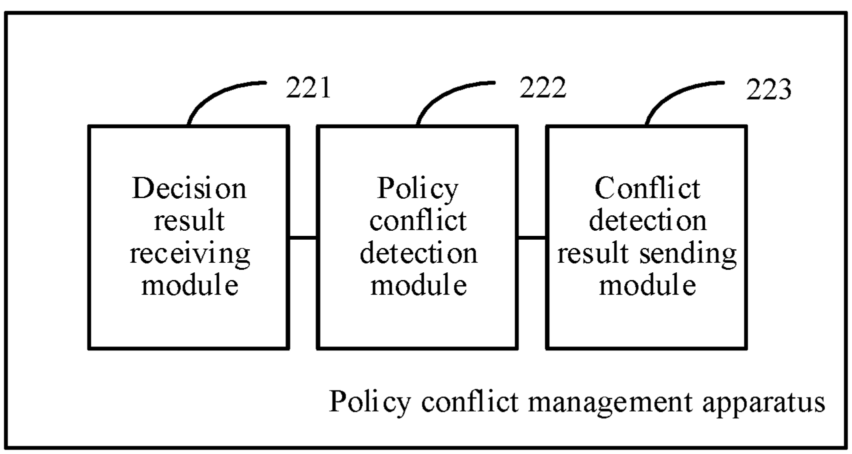
FIG. 22 is a schematic diagram of a structure of a policy conflict management apparatus according to an embodiment of this application.

FIG. 22 is a schematic diagram of a structure of a policy conflict management apparatus according to an embodiment of this application. The apparatus may be used in the core network in any scenario in FIG. 3 to FIG. 5, and is configured to perform the policy conflict management method shown in FIG. 20. As shown in FIG. 22, the apparatus may include:

a decision result receiving module 221, configured to receive a first decision result from a radio access network RAN network element, where the first decision result is a decision result obtained after a first controller makes a policy decision according to a second policy, and the second policy is a policy configured by a second controller for user equipment UE;

a policy conflict detection module 222, configured to detect whether a policy conflict occurs between the first decision result and first policy information, where the first policy information includes a first policy configured by the core network for the UE; and a conflict detection result sending module 223, configured to send a policy conflict detection result to the RAN network element, where the policy conflict detection result includes: a policy conflict occurs between the first decision result and the first policy information, or no policy conflict occurs between the first decision result and the first policy information.

In an embodiment, the first controller is a radio access intelligent controller, and the second controller is a radio access management controller; or both the first controller and the second controller are radio access management controllers.

In an embodiment, the decision result receiving module 221 is specifically configured to: receive a protocol data unit PDU session resource modification indication message or a policy modification request message from the core network, where the PDU session resource modification indication message or the policy modification request message includes the first decision result; and obtain the first decision result from the PDU session resource modification indication message or the policy modification request message.

In an embodiment, the conflict detection result sending module 223 is specifically configured to: add the policy conflict detection result or indication information indicating the policy conflict detection result to the PDU session resource modification confirm message; and send the PDU session resource modification confirm message to the RAN network element.

In an embodiment, the policy conflict detection result is that no policy conflict occurs between the first decision result and the first policy information. The policy conflict management apparatus may further include: a PDU session modification request message sending module, configured to send a PDU session modification request message to the RAN network element, so that the RAN network element executes the first decision result based on the PDU session modification request message.

It should be understood that the apparatus is configured to perform the policy conflict management method in FIG. 18 or FIG. 20. An implementation principle and a technical effect of a corresponding program module in the apparatus are similar to those described in the policy conflict management method in FIG. 18 or FIG. 20. For a working process of the apparatus, refer to a corresponding process in the policy conflict management method in FIG. 18 or FIG. 20. Details are not described herein again.

Figure 23:
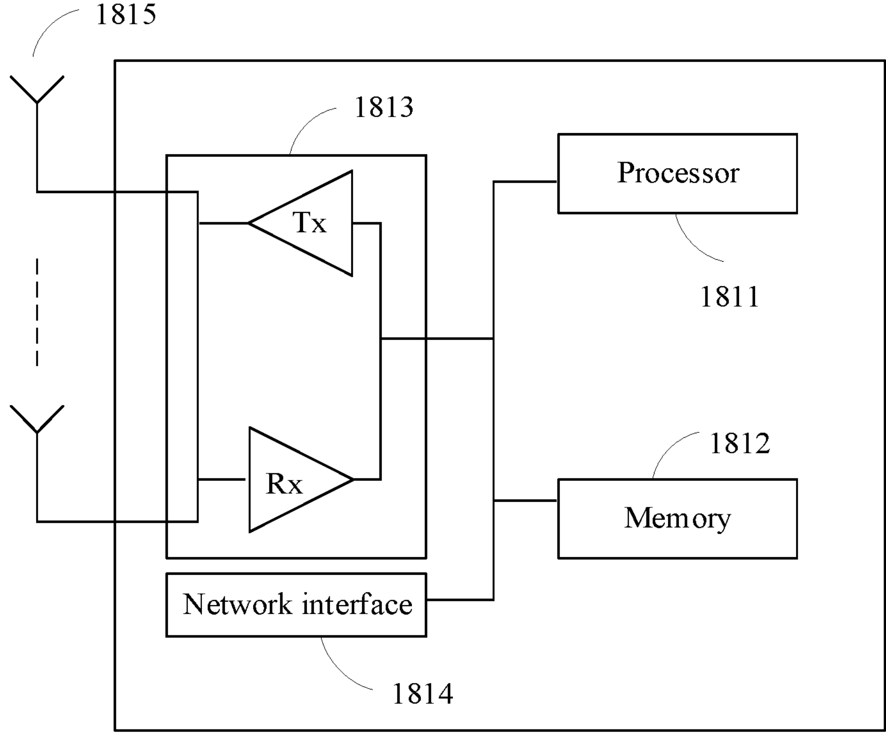
FIG. 23 is a schematic diagram of a structure of a communication apparatus according to an embodiment of this application.

Next, FIG. 23 is a schematic diagram of a structure of a communication apparatus according to an embodiment of this application. The communication apparatus may be a first controller, and the first controller may be the radio access intelligent controller or the radio access management controller in any scenario in FIG. 3 to FIG. 5. The communication apparatus may implement a function of the first controller in the foregoing method embodiments. Alternatively, the communication apparatus may be a RAN network element, and the RAN network element may be the CU-CP in FIG. 3, the CU in FIG. 4, or the gNB in FIG. 5. The communication apparatus may implement a function of the RAN network element in the foregoing method embodiments. For ease of description, FIG. 23 shows main components of the communication apparatus. As shown in FIG. 23, the communication apparatus includes at least one processor 1811, at least one memory 1812, at least one transceiver 1813, at least one network interface 1814, and one or more antennas 1815. The processor 1811, the memory 1812, the transceiver 1813, and the network interface 1814 are connected to each other, for example, through a bus. In this embodiment of this application, the connection may include various interfaces, transmission lines, buses, or the like. This is not limited in this embodiment. The antenna 1815 is connected to the transceiver 1813. The network interface 1814 is configured to enable the communication apparatus to be connected to another network device through a communication link.

The processor 1811 is mainly configured to: process a communication protocol and communication data, control the entire node, execute a software program, and process data of the software program.

In an optional implementation, the processor may include a baseband processor and a central processing unit. The baseband processor is mainly configured to process the communication protocol and the communication data. The central processing unit is mainly configured to: control the entire terminal device, execute the software program, and process the data of the software program. Alternatively, functions of the baseband processor and the central processing unit may be integrated into the processor. A person skilled in the art may understand that the baseband processor and the central processing unit may alternatively be processors independent of each other, and are interconnected by using a technology such as a bus. A person skilled in the art may understand that the node may include a plurality of baseband processors to adapt to different network standards, the node may include a plurality of central processing units to enhance a processing capability of the node, and components of the node may be connected through various buses. The baseband processor may also be expressed as a baseband processing circuit or a baseband processing chip. The central processing unit may alternatively be expressed as a central processing circuit or a central processing chip. A function of processing the communication protocol and the communication data may be built in the processor, or may be stored in the memory in a form of a software program. The processor executes the software program to implement a baseband processing function.

The memory 1812 is mainly configured to store the software program and data. The memory 1812 may exist independently, and is connected to the processor 1811. Optionally, the memory 1812 and the processor 1811 may be integrated together, for example, integrated on a single chip, namely, an on-chip memory, or the memory 1812 is an independent storage element. This is not limited in this embodiment of this application. The memory 1812 can store program code for executing the technical solutions in embodiments of this application, and the processor 1811 controls the execution. Various types of executed computer program code may also be considered as driver programs of the processor 1811.

The transceiver 1813 may be configured to perform conversion between a baseband signal and a radio frequency signal and process the radio frequency signal. The transceiver 1813 may be connected to the antenna 1815. The transceiver 1813 includes a transmitter (transmitter, Tx) and a receiver (Rx). Specifically, the one or more antennas 1815 may receive the radio frequency signal. The receiver Rx in the transceiver 1813 is configured to: receive the radio frequency signal from the antenna, convert the radio frequency signal into a digital baseband signal or a digital intermediate frequency signal, and provide the digital baseband signal or the digital intermediate frequency signal for the processor 1811, so that the processor 1811 further processes the digital baseband signal or the digital intermediate frequency signal, for example, performs demodulation processing and decoding processing. In addition, the transmitter Tx in the transceiver 1813 is further configured to: receive a modulated digital baseband signal or digital intermediate frequency signal from the processor 1811, convert the modulated digital baseband signal or digital intermediate frequency signal into a radio frequency signal, and send the radio frequency signal through the one or more antennas 1815. Specifically, the receiver Rx may selectively perform one or more levels of frequency down-mixing processing and analog-to-digital conversion processing on the radio frequency signal to obtain the digital baseband signal or the digital intermediate frequency signal. A sequence of the frequency down-mixing processing and the analog-to-digital conversion processing is adjustable. The transmitter Tx may selectively perform one or more levels of frequency up-mixing processing and digital-to-analog conversion processing on the modulated digital baseband signal or the modulated digital intermediate frequency signal to obtain the radio frequency signal. A sequence of the frequency up-mixing processing and the digital-to-analog conversion processing is adjustable. The digital baseband signal and the digital intermediate frequency signal may be collectively referred to as digital signals. Optionally, the transmitter Tx and the receiver Rx may be implemented by different physical structures/circuits, or may be implemented by a same physical structure/circuit, namely, the transmitter Tx and the receiver Rx may be inherited together.

The transceiver may also be referred to as a transceiver unit, a transceiver machine, a transceiver apparatus, or the like. Optionally, a component that is configured to implement a receiving function and that is in the transceiver unit may be considered as a receiving unit, and a component that is configured to implement a sending function and that is in the transceiver unit may be considered as a sending unit. In other words, the transceiver unit includes the receiving unit and the sending unit. The receiving unit may also be referred to as a receiver, an input port, a receiving circuit, or the like. The sending unit may be referred to as a transmitter, a transmitter machine, a transmitting circuit, or the like. Alternatively, the Tx, the Rx, and the antenna may be combined into a transceiver.

In FIG. 23, if the communication apparatus is a first controller, the first controller may communicate with the RAN network element through an R2 interface, to complete information and/or message sending and receiving between the first controller and the RAN network element in this embodiment of this application. If the communication apparatus is the RAN network element, the RAN network element may communicate with the first controller through R2, to complete information and/or message sending and receiving between the RAN network element and the first controller in this embodiment of this application. For specific information and/or messages, refer to content in the foregoing embodiment. Details are not described herein again.

An embodiment of this application further provides a policy conflict management system, including a first controller, a second controller, and a RAN network element. The first controller may perform the policy conflict management method in FIG. 12.

An embodiment of this application further provides a policy conflict management system, including a first controller, a second controller, and a RAN network element. The first controller is configured to perform the policy conflict management method in FIG. 13, and the RAN network element is configured to perform the policy conflict management method in FIG. 14.

An embodiment of this application further provides a policy conflict management system, including a first controller, a second controller, a RAN network element, and a core network. The RAN network element is configured to perform the policy conflict management method in FIG. 19, and the core network is configured to perform the policy conflict management method in FIG. 20.

An embodiment of this application further provides a computer storage medium. The computer storage medium includes computer instructions. When the computer instructions are run, the policy conflict management method in FIG. 12, the policy conflict management method in FIG. 13, the policy conflict management method in FIG. 14, the policy conflict management method in FIG. 19, or the policy conflict management method in FIG. 20 is enabled to be performed.

An embodiment of this application further provides a computer storage medium. The computer storage medium includes computer instructions. When the computer instructions area run, the policy conflict management method in FIG. 12, the policy conflict management method in FIG. 13, the policy conflict management method in FIG. 14, the policy conflict management method in FIG. 19, or the policy conflict management method in FIG. 20 is enabled to be performed.

It may be understood that, the processor in embodiments of this application may be a central processing unit (CPU), the processor may further be another general-purpose processor, a digital signal processor (DSP), an application-specific integrated circuit (ASIC), a field programmable gate array (FPGA) or another programmable logic device, a transistor logic device, a hardware component, or any combination thereof. The general-purpose processor may be a microprocessor or any regular processor.

The method steps in embodiments of this application may be implemented in a hardware manner, or may be implemented in a manner of executing software instructions by the processor. The software instructions may include corresponding software modules. The software modules may be stored in a random access memory (RAM), a flash memory, a read-only memory (read-only memory, ROM), a programmable read-only memory (PROM), an erasable programmable read-only memory (EPROM), an electrically erasable programmable read-only memory (EEPROM), a register, a hard disk, a removable hard disk, a CD-ROM, or any other form of storage medium well-known in the art. For example, a storage medium is coupled to a processor, so that the processor can read information from the storage medium and write information into the storage medium. Certainly, the storage medium may alternatively be a component of the processor. The processor and the storage medium may be located in an ASIC.

All or a part of the foregoing embodiments may be implemented by software, hardware, firmware, or any combination thereof. When software is used to implement the foregoing embodiments, all or a part of the foregoing embodiments may be implemented in a form of a computer program product. The computer program product includes one or more computer instructions. When the computer program instructions are loaded and executed on the computer, the procedures or functions according to embodiments of this application are all or partially generated. The computer may be a general-purpose computer, a dedicated computer, a computer network, or other programmable apparatuses. The computer instructions may be stored in a computer-readable storage medium, or may be transmitted by using the computer-readable storage medium. The computer instructions may be transmitted from a website, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

It may be understood that numerical symbols involved in embodiments of this application are differentiated merely for ease of description, but are not used to limit the scope of embodiments of this application.

What is claimed is:

1. A method for networking policy conflict management, comprises:

receiving, by a first controller, first policy information comprising a first policy configured by a core network for a user equipment (UE), wherein the first controller is a radio access intelligent controller or a radio access management controller;

detecting, by the first controller, that a policy conflict occurs between the first policy information and second policy information, wherein the second policy information comprises a second policy configured by a second controller for the UE, or a first decision result obtained after the first controller makes a policy decision according to the second policy;

making, by the first controller, a policy decision according to the first policy and the second policy to obtain a second decision result; and sending, by the first controller, the second decision result to a radio access network (RAN) network element for the RAN network element to execute the second decision result.

2. The method according to claim 1, wherein the step of receiving the first policy information receives the first policy information through the RAN network element.

3. The method according to claim 2, wherein the step of receiving the first policy information comprises:

sending a first subscription request message for subscription information of the UE to the RAN network element; and receiving a first subscription response message from the RAN network element, wherein the first subscription response message comprises the first policy information.

4. The method according to claim 2, further comprising:

receiving a first policy instance creation message from the second controller, wherein the first policy instance creation message comprises the second policy.

5. The method according to claim 1, wherein the step of receiving the first policy information receives the first policy information through the second controller.

6. The method according to claim 5, wherein the step of receiving the first policy information comprises:

receiving a second policy instance creation message from the second controller, wherein the second policy instance creation message comprises the first policy information and the second policy, and the first policy information is information received by the second controller from the core network through an operation, administration, and maintenance (OAM) entity.

7. The method according to claim 1, wherein the second controller is a radio access management controller.

8. The method according to claim 1, wherein the step of receiving the first policy information receives the first policy information through an operation, administration, and maintenance (OAM) entity or through the RAN network element.

9. The method according to claim 8, wherein the step of receiving the first policy information comprises:

sending a second subscription request message for subscription information of the UE to the core network through the OAM entity; and receiving a second subscription response message from the core network through the OAM entity, wherein the second subscription response message comprises the first policy information; or sending a third subscription request message for the subscription information of the UE to the RAN network element through a radio intelligent management controller; and receiving a third subscription response message from the RAN network element through the radio intelligent management controller, wherein the third subscription response message comprises the first policy information.

10. A radio access network (RAN) network element, comprising:

a memory storing executable instructions;

a processor configured to execute the executable instructions to perform operations of:

receiving first policy information from a core network, wherein the first policy information comprises a first policy configured by the core network for a user equipment (UE);

detecting that a policy conflict occurs between the first policy information and a first decision result, wherein the first decision result is obtained after a first controller makes a policy decision according to a second policy, and the second policy is configured by a second controller for the UE, wherein the first controller is a radio access intelligent controller or a radio access management controller;

sending a first message to the first controller, wherein the first message comprises policy conflict indication information, a UE identifier of the UE, and the first policy information, wherein the policy conflict indication information indicates that the policy conflict occurs between the first policy information and the first decision result;

receiving a second decision result from the first controller, wherein the second decision result is obtained after the first controller makes a policy decision according to the first policy and the second policy; and executing the second decision result.

11. The RAN network element according to claim 10, wherein the second controller is a radio access management controller.

12. The RAN network element according to claim 10, wherein both the first controller and the second controller are radio access management controllers; and the method further comprises:

receiving the first decision result from the radio access management controller through a radio access intelligent controller.

13. A controller, wherein a first controller is a radio access intelligent controller or a radio access management controller and comprises:

a memory storing executable instructions;

a processor configured to execute the executable instructions to perform operations of:

receiving first policy information comprising a first policy configured by a core network for a user equipment (UE);

detecting that a policy conflict occurs between the first policy information and second policy information, wherein the second policy information comprises a second policy configured by a second controller for the UE, or a first decision result obtained after the first controller makes a policy decision according to the second policy;

making a policy decision according to the first policy and the second policy to obtain a second decision result; and sending the second decision result to a radio access network (RAN) network element for the RAN network element to execute the second decision result.

14. The controller according to claim 13, wherein the operation of receiving the first policy information receives the first policy information through the RAN network element.

15. The controller according to claim 14, wherein the operation of receiving the first policy information comprises:

sending a first subscription request message for subscription information of the UE to the RAN network element; and receiving a first subscription response message from the RAN network element, wherein the first subscription response message comprises the first policy information.

16. The controller according to claim 14, wherein the processor is further configured to perform an operation of:

receiving a first policy instance creation message from the second controller, wherein the first policy instance creation message comprises the second policy.

17. The controller according to claim 13, wherein the operation of receiving the first policy information receives the first policy information through the second controller.

* * * * *